(12) United States Patent
Cooke et al.

(10) Patent No.: US 8,300,113 B2
(45) Date of Patent: Oct. 30, 2012

(54) HADAMARD MULTIMODE OPTICAL IMAGING TRANSCEIVER

(75) Inventors: Bradly J. Cooke, Los Alamos, NM (US); David C. Guenther, Los Alamos, NM (US); Joe J. Tiee, Los Alamos, NM (US); Mervyn J. Kellum, Los Alamos, NM (US); Nicholas L. Olivas, Los Alamos, NM (US); Nina R. Weisse-Bernstein, Los Alamos, NM (US); Stephen L. Judd, Los Alamos, NM (US); Thomas R. Braun, Sterling, VA (US)

(73) Assignee: Los Alamos National Security, LLC, Los Alamos, NM (US)

( * ) Notice: Subject to any disclaimer, the term of this patent is extended or adjusted under 35 U.S.C. 154(b) by 991 days.

(21) Appl. No.: 12/249,763

(22) Filed: Oct. 10, 2008

(65) Prior Publication Data
US 2010/0091134 A1   Apr. 15, 2010

(51) Int. Cl.
*H04N 5/228* (2006.01)
(52) U.S. Cl. ............. 348/222.1; 382/281; 708/410
(58) Field of Classification Search ........... 348/222.1; 382/281; 708/410
See application file for complete search history.

(56) References Cited

U.S. PATENT DOCUMENTS

| | | | |
|---|---|---|---|
| 5,495,299 A * | 2/1996 | Suzuki et al. | 348/620 |
| 5,773,832 A * | 6/1998 | Sayed et al. | 250/370.09 |
| 2002/0006171 A1 * | 1/2002 | Nielsen | 375/316 |

* cited by examiner

*Primary Examiner* — Usman Khan
(74) *Attorney, Agent, or Firm* — Christopher P. Whitham; Samuel M. Freund; Cochran Freund & Young LLC

(57) ABSTRACT

Disclosed is a method and system for simultaneously acquiring and producing results for multiple image modes using a common sensor without optical filtering, scanning, or other moving parts. The system and method utilize the Walsh-Hadamard correlation detection process (e.g., functions/matrix) to provide an all-binary structure that permits seamless bridging between analog and digital domains. An embodiment may capture an incoming optical signal at an optical aperture, convert the optical signal to an electrical signal, pass the electrical signal through a Low-Noise Amplifier (LNA) to create an LNA signal, pass the LNA signal through one or more correlators where each correlator has a corresponding Walsh-Hadamard (WH) binary basis function, calculate a correlation output coefficient for each correlator as a function of the corresponding WH binary basis function in accordance with Walsh-Hadamard mathematical principles, digitize each of the correlation output coefficient by passing each correlation output coefficient through an Analog-to-Digital Converter (ADC), and performing image mode processing on the digitized correlation output coefficients as desired to produce one or more image modes. Some, but not all, potential image modes include: multi-channel access, temporal, range, three-dimensional, and synthetic aperture.

18 Claims, 15 Drawing Sheets

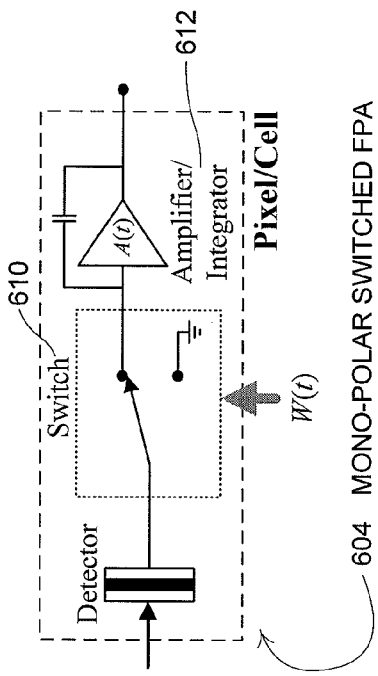
FIG. 6A 602 GATED ICCD (MONO-POLAR)
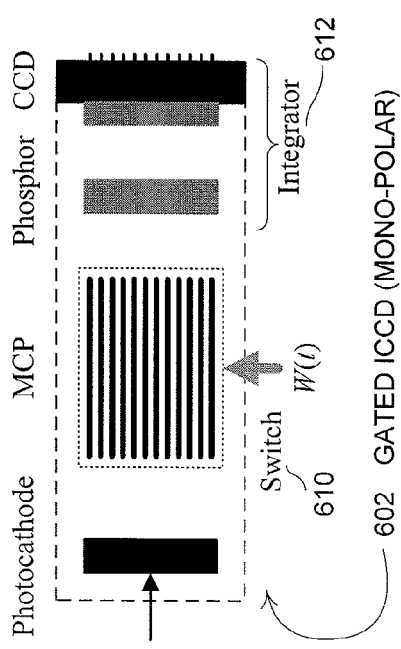
FIG. 6B 604 MONO-POLAR SWITCHED FPA
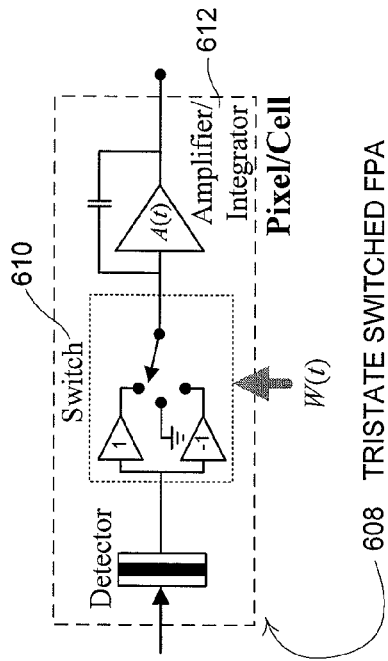
FIG. 6C 606 BIPOLAR SWITCHED FPA
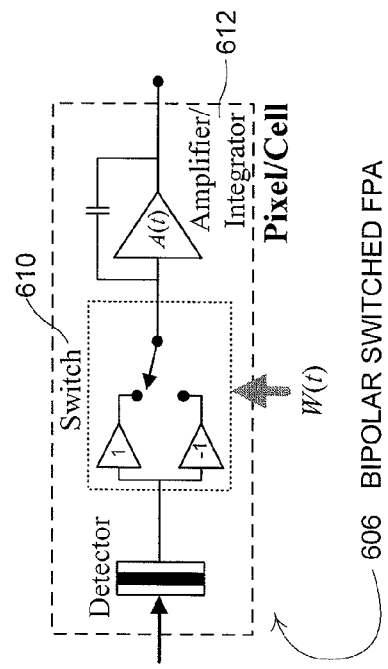
FIG. 6D 608 TRISTATE SWITCHED FPA

HADAMARD MULTIMODE OPTICAL IMAGING TRANSCEIVER

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF THE INVENTION

Development of multimode optical imaging technology has centered on coherent heterodyne or homodyne detection processes. Heterodyne (or homodyne) detection of electromagnetic fields is based on the interferometric mixing of a coherent reference field or "local oscillator" with a coherent object field in a manner that captures and preserves amplitude and phase information. The fundamental advantages of coherent over non-coherent detection processes include the filterless separation of image fields from clutter and background, controlled noise bandwidths, and coherent amplification. In practice, coherent processes enable system designers to exploit a broad range of multimode detection building blocks, including multi-channel access, amplitude/phase detection, and range/Doppler discrimination.

Practical implementation of coherent detection technology at short wavelengths is hindered by the intrinsic difficulty in matching the spatio-temporal states of object and reference fields. Spatio-temporal states characterize the time-varying spatial amplitude, phase, and polarization distribution of a propagating field where spatial states become critical when the transverse dimensions of the receiver aperture are large compared with the field's wavelength. A stable coherent detection process requires precise temporal and spatial matching of the object and reference field states. The progressive loss in spatio-temporal coherence between object and reference fields eventually leads to systematic phase and amplitude degradations in the detection process resulting in loss of conversion efficiency, corrupted image retrieval, and increased noise bandwidth. Causes of spatio-temporal mismatches include transceiver source/reference drift and fluctuations, atmospheric turbulence, scattering from rough surfaces, relative motion. A description of scalar projection process and relevant experimental apparatus may be found in U.S. Pat. No. 5,875,030, B. J. Cooke and A. Galbraith, *Method and Apparatus for Coherent Electromagnetic Field Imaging through Fourier Transform Heterodyne*.

Scalar projection concepts led to hybrid fields that provide a mechanism through which spatial and temporal matched filter conditions required for short wavelength coherent detection are realized. In essence, hybrid fields superpositions of two or more matched fields with coherent detection uniqueness introduced through the selective modulation of one set of field states relative to a matching set of field states. Modulation is necessary because the modulation creates a distinctly detectable interferometric signature under square-law detection. Applicable hybrid field modulation formats include: amplitude, phase, frequency, and polarization. Successive experiments demonstrated the feasibility of generating and manipulating hybrid fields for efficient coherent detection or range, Doppler, and multi-channel imaging. Further, the experiments established the concept of synthetic wavelengths and stationary phase processes, which are vital to understanding synthetic aperture image degradation at short wavelengths. Hybrid fields and the associated experimental apparatus are described in more detail in U.S. Pat. No. 7,417,744, B. J. Cooke and D. C. Gunether, *Coherent Hybrid Electromagnetic Field Imaging*.

SUMMARY OF THE INVENTION

An embodiment of the present invention may comprise a method for capturing an image of a target through a single common sensor and producing at least one image mode of said target comprising: capturing an incoming optical signal at an optical aperture; detecting the incoming optical signal captured at the optical aperture with a square-law sensor acting as the common sensor to convert the incoming optical signal to an electrical signal; passing the electrical signal through a low-noise amplifier to produce a Low-Noise Amplified (LNA) signal; passing the LNA signal through at least one correlator, the at least one correlator having a time scalable Walsh-Hadamard binary basis function; calculating a correlation output coefficient for the at least one correlator in order to temporally correlate the LNA signal, the correlation output coefficient of the at least one correlator being calculated in accordance with Walsh-Hadamard mathematical principles as a function of the Walsh-Hadamard binary basis function of the at least one correlator; digitizing the correlation output coefficient of the at least one correlator into a digital correlation output coefficient for the at least one correlator by passing the correlation output coefficient signal through an analog-to-digital converter for the at least one correlator; and, performing image mode processing on the digital correlation output coefficient of the at least one correlator in a digital processing domain to produce the at least one image mode.

An embodiment of the present invention may further comprise a multimode image acquisition system for capturing an image of a target through a single common sensor and producing at least one image mode of said target comprising: an optical aperture that captures an incoming optical signal; a detector that detects the incoming optical signal captured at the optical aperture to convert the incoming optical signal to an electrical signal, the detector being a square-law sensor acting as the common sensor; a low-noise amplifier that receives the electrical signal and produces a Low-Noise Amplified (LNA) signal; at least one correlator that receives the LNA signal and calculates a correlation output coefficient for the at least one correlator in order to temporally correlate the LNA signal, the at least one correlator having a time scalable Walsh-Hadamard binary basis function, the correlation output coefficient being calculated in accordance with Walsh-Hadamard mathematical principles as a function of the Walsh-Hadamard binary basis function of the at least one correlator; an analog-to-digital converter that accepts the correlation output coefficient of the at least one correlator and that digitizes the correlation output coefficient into a digital correlation output coefficient signal for the at least one correlator; and, a multimode image processing subsystem that performs image mode processing on the digital correlation output coefficient for the at least one correlator in a digital processing domain to produce the at least one image mode.

An embodiment of the present invention may further comprise a multimode image acquisition system for capturing an image of a target through a single common sensor and producing at least one image mode of said target comprising: means for capturing an incoming optical signal at an optical aperture; means for detecting the incoming optical signal captured at the optical aperture with a square-law sensor acting as the common sensor to convert the incoming optical signal to an electrical signal; means for passing the electrical signal through a low-noise amplifier to produce a Low-Noise Amplified (LNA) signal; means for passing the LNA signal through at least one correlator, the at least one correlator having a time scalable Walsh-Hadamard binary basis function; means for calculating a correlation output coefficient for the at least one correlator, the correlation output coefficient of the at least one correlator being calculated in accordance with Walsh-Hadamard mathematical principles as a function of the Walsh-Hadamard binary basis function of the at least one correlator; means for digitizing the correlation output coefficient of the at least one correlator into a digital correlation output coefficient for the at least one correlator by passing the correlation output coefficient signal through an analog-to-digital converter for the at least one correlator; and, means for performing image mode processing on the digital correlation output coefficient of the at least one correlator in a digital processing domain to produce the at least one image mode.

BRIEF DESCRIPTION OF THE DRAWINGS

In the drawings,

FIG. 6A-D are schematic illustrations of various switched topologies compatible with conventional UltraViolet (UV), Visible (Vis), and InfraRed (IR) imaging technologies employed in the synthesis of correlation detection processes for an embodiment.

FIG. 6A is a schematic illustration of a gated Intensified-Charge Coupled Device (ICCD) topology.

FIG. 6B is a schematic illustration of a mono-polar switched Focal Plane Array (FPA) topology.

FIG. 6C is a schematic illustration of a bipolar switched FPA topology.

FIG. 6D is a schematic illustration of a tristate switched FPA topology.

DETAILED DESCRIPTION OF THE EMBODIMENTS

Figure 1:
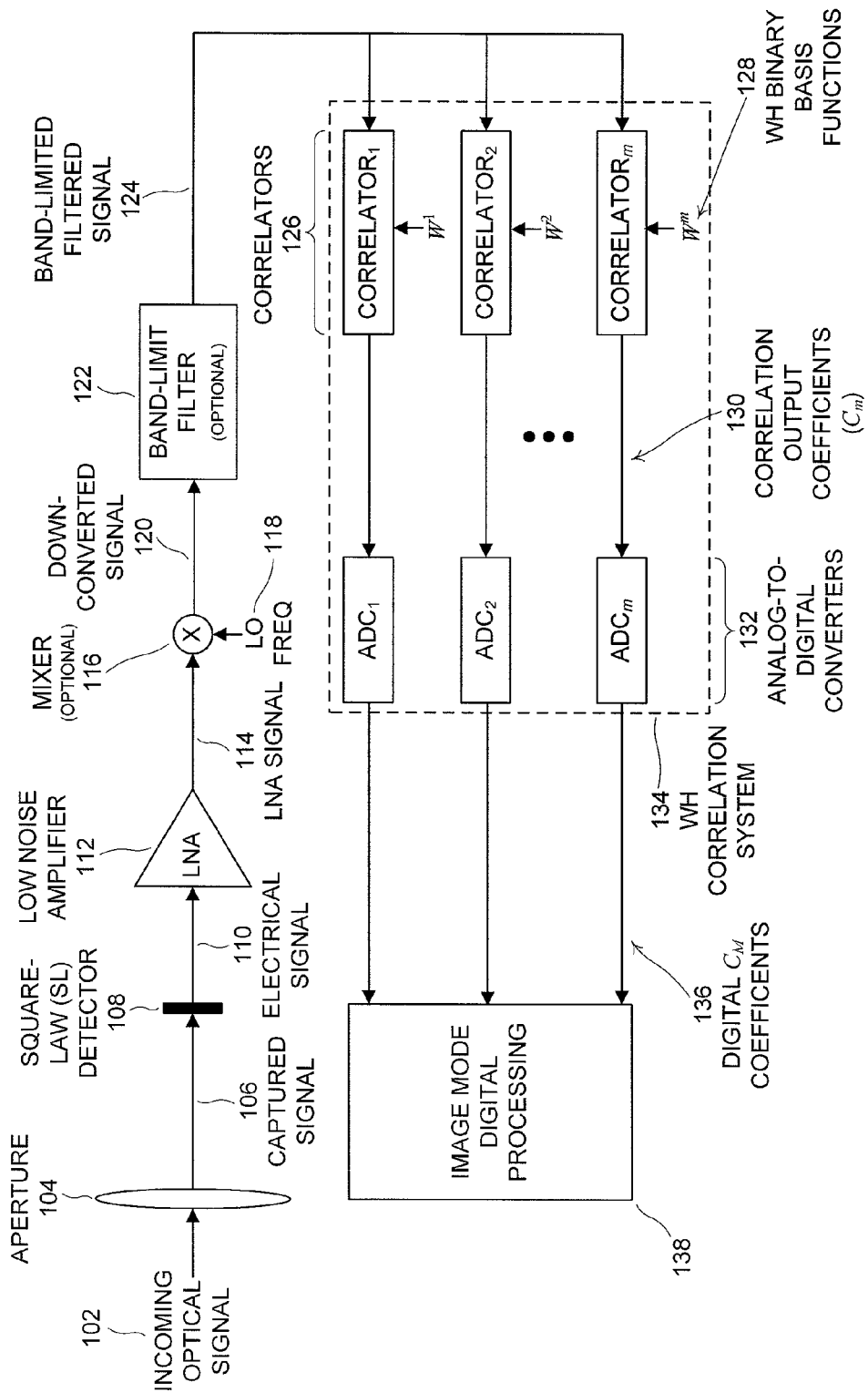
FIG. 1 is a schematic illustration of a Walsh-Hadamard (WH) correlation architecture for a time-domain optical detection system of an embodiment.

FIG. 1 is a schematic illustration of a Walsh-Hadamard (WH) correlation architecture 100 for a time-domain optical detection system of an embodiment. While feasibility of utilizing hybrid fields for synthesis of multimode detection has been experimentally established, the interferometric schemes required for the generation and detection of frequency-domain hybrids proved cumbersome in implementation. However, time-domain hybrid fields have not been explored and, as demonstrated below, time-domain hybrid fields based on time-frequency duality appear to be useful. In contrast to a coherent process which detects field amplitude through interference of source and reference fields, a time-domain process may measure field intensity via square-law detection followed by (interferometric) temporal correlation. In other words, the reference field is replaced by a reference scalar (e.g., voltage, current, charge, or equivalent photonic signal) mitigating short wavelength spatial coherence problems. Research has demonstrated the viability of implementing time-domain correlation processes based on "all-binary" reference functions. Walsh-Hadamard (WH) mathematical principles comprise Walsh functions placed in Hadamard matrices. The WH mathematical principles describe orthogonal binary correlation principles for data. By combining time-frequency correlation architectures with binary orthogonal theory, various embodiments of a Walsh-Hadamard (WH) correlation detection process may be created and applied to multimode imaging.

For the WH correlation architecture 100 shown in FIG. 1, an incoming optical signal 102 is captured at an aperture 104, where the incoming optical signal 102 is typically, but not limited to, a cyclo-stationary optical signal. A cyclo-stationary signal is a signal that is periodic over the acquisition interval. The aperture 104 focuses a captured/incident optical signal 106 onto the Square-Law (SL) detector 108. The aperture 104 may be comprised of a primary optical aperture focused onto the SL detector 108 by an optical secondary. The captured/incident optical signal 106 creates an electrical signal 110 based on the captured optical signal 106. The electrical signal is Low-Noise Amplified (LNA) by the low-noise amplifier 112 to create an LNA electrical signal 114. The LNA electrical signal 114 may optionally be sent through optional mixer 116 to mix the LNA signal 114 with a low frequency 118 to convert the LNA signal 114 to a lower intermediate-frequency signal 120 (aka. a down-converted signal 120). In the case where optional mixer 116 is included, the down-converted signal 120 may be optionally sent through optional band-limit filter 122 to create a band-limited filtered signal 124. Either the LNA signal 114 (no mixer 116 or band-limit filter 122 present) or the band-limited filtered signal 124 (mixer 116 and band-limit filter 122 present) is then temporally correlated in the Walsh-Hadamard (WH) correlation system 134 by one or more correlators 126 based on the WH binary basis functions 128 corresponding to each correlator 126. To temporally correlate the LNA signal 114 (or the band-limited filtered signal 124), the LNA signal 114 (or the band-limited filtered signal 124) is passed through the one or more correlators 124. There is a WH binary basis function 128 that corresponds on a one-to-one basis with each correlator 126. Each correlator 126 calculates a correlation output coefficient ($C_m$) 130 that corresponds on a one-to-one basis with each correlator 126 performing the calculation. The calculation of the correlation output coefficients 130 is performed in accordance with Walsh-Hadamard mathematical principles as a function of the corresponding WH binary basis functions 128. The correlation output coefficient 130 are digitized into digital correlation output coefficients ($C_m$) 136 by one of the Analog-to-Digital Converters (ADC) 132 such that there is a one-to-one correspondence between the ADCs 132, the correlation output coefficients 130, and the digital correlation output coefficients 136. For the WH correlation system 134, there is a one-to-one correspondence between the one or more correlators 126, the WH binary basis functions 128, the correlation output coefficients 130, the ADCs 132, and the digital correlation output coefficients 136. The digital correlation output coefficients 136 are processed at 138 to perform various processing modes to produce at least one image mode.

Since the digital correlation output coefficients 136 are delivered in digital form to the image mode processing system 138, the same digital correlation output coefficients 136 may be used simultaneously in multiple image mode processes. Due to the limited arithmetic necessary to perform the calculations, the WH correlation system 134 may deliver the digital correlation output signals 136 in real-time such that the image mode processing system 138 may perform the image mode processing calculations in the digital domain in real-time and simultaneously for multiple image mode processes for image data from a single, common sensor. Further, the WH correlation system 100, does not require optical filtering, scanning, or other moving parts to simultaneously process 138 multiple image modes.

The temporal correlation calculations are based on the time scalable WH binary basis functions ($W^m$) 128. The function $W^m$ may vary for m=1,2, ..., M. A Hadamard matrix, H, is constructed from Walsh functions and can be written as in Eq. 1 below.

$$H = \begin{bmatrix} W^1 \\ W^1 \\ \vdots \\ W^M \end{bmatrix} = \begin{bmatrix} W_1^1 & W_2^1 & \cdots & W_M^1 \\ W_1^2 & W_2^2 & \cdots & W_M^2 \\ \vdots & \vdots & \ddots & \vdots \\ W_1^M & W_1^M & \cdots & W_M^M \end{bmatrix} \quad \text{Eq. 1}$$

In general, for a sequence of length M=2 L, the Hadamard matrix is generated through the recursive relation of Eq. 2.

$$H^1 = 1, H^{2L} = \begin{bmatrix} H^L & H^L \\ H^L & \overline{H}^L \end{bmatrix} \quad \text{Eq. 2}$$

In Eq. 1, the complement of $H^L$ (H with a line on top) is given by 1→−1. The matrix below is an example of how a Hadamard matrix is constructed for M=8.

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

An important property of Walsh functions is that the inner product of any two sequences m and m' yield Eq. 3 below.

$$\frac{1}{M}\langle W^m, W^{m'}\rangle = \begin{pmatrix} 1 & m = m' \\ 0 & m \neq m' \end{pmatrix}, \quad m = 1, \ldots, M \quad \text{Eq. 3}$$

Thus, the Walsh functions are orthogonal. Further, because Walsh functions form a complete binary basis set, a signal such as S(t), may be uniquely decomposed and reconstructed in terms of $W^m$ and projected coefficients $C_m(t)$ via the transform relation in Eq. 4.

$$C_m(t) = \int_\tau W^m(t)S(t)dt \iff S(t) = HC \quad \text{Eq 4}$$

In Eq. 4, C is a vector of projected coefficients $C_m(t)$ and H is the Hadamard matrix of Eq. 1. Note that Eq. 4 is just the vectorized correlation process implicitly depicted in FIG. 1.

Figure 2:
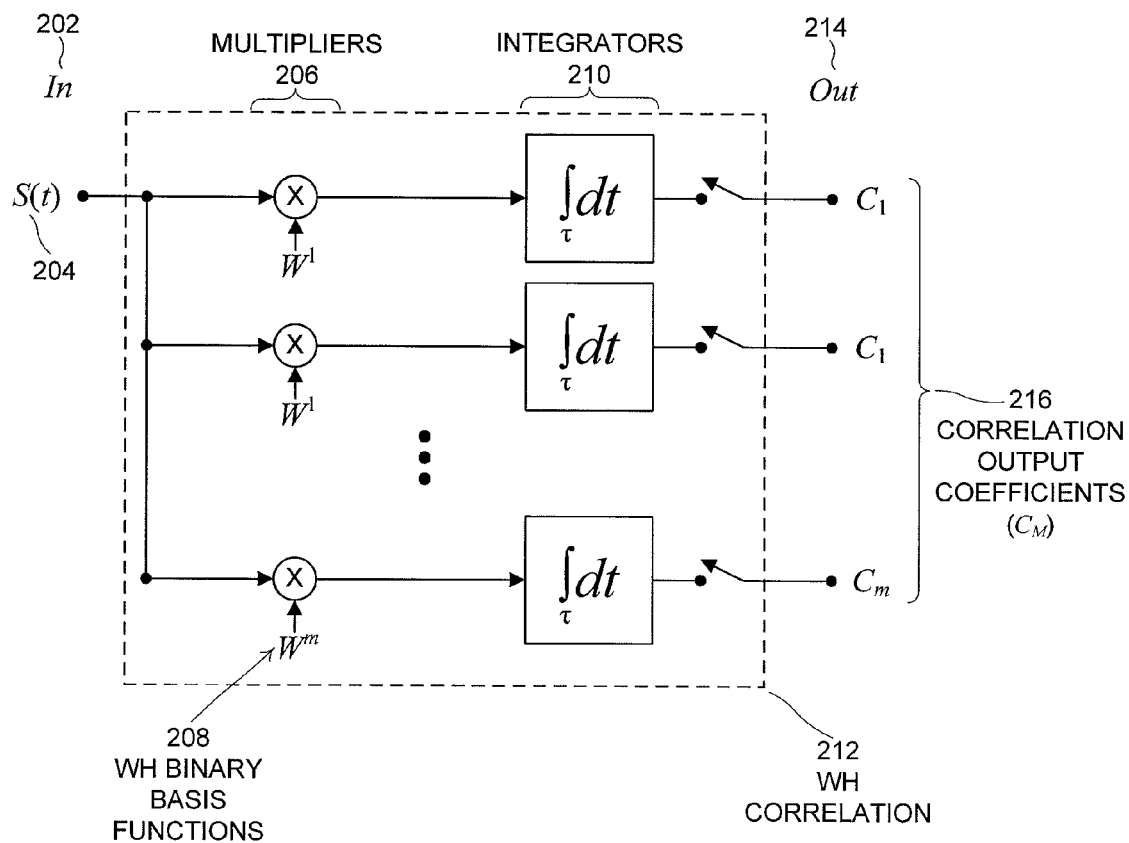
FIG. 2 is detailed schematic illustration of an implementation of a WH correlation for an embodiment.

FIG. 2 is detailed schematic illustration 200 of an implementation of a WH correlation 212 for an embodiment. The explicit implementation of the WH correlation blocks 126 in FIG. 1 is illustrated in FIG. 2. As will be shown below in the disclosure with regard to FIGS. 5-8, the binary multiplication and integration illustrated in FIG. 2 is readily implemented using simple addition and subtraction, greatly simplifying circuitry. The input signal 202 is defined to be S(t) 204. S(t) is uniquely decomposed and reconstructed in terms of the Walsh functions $W^m$ 208 and the correlation output coefficients $C_m$ 216. To perform the WH correlation 212, the $W^m$ 208 are multiplied times the input signal 202 (aka. S(t)) 204, via multipliers 206 and are then integrated via integrators 210.

Figure 3:
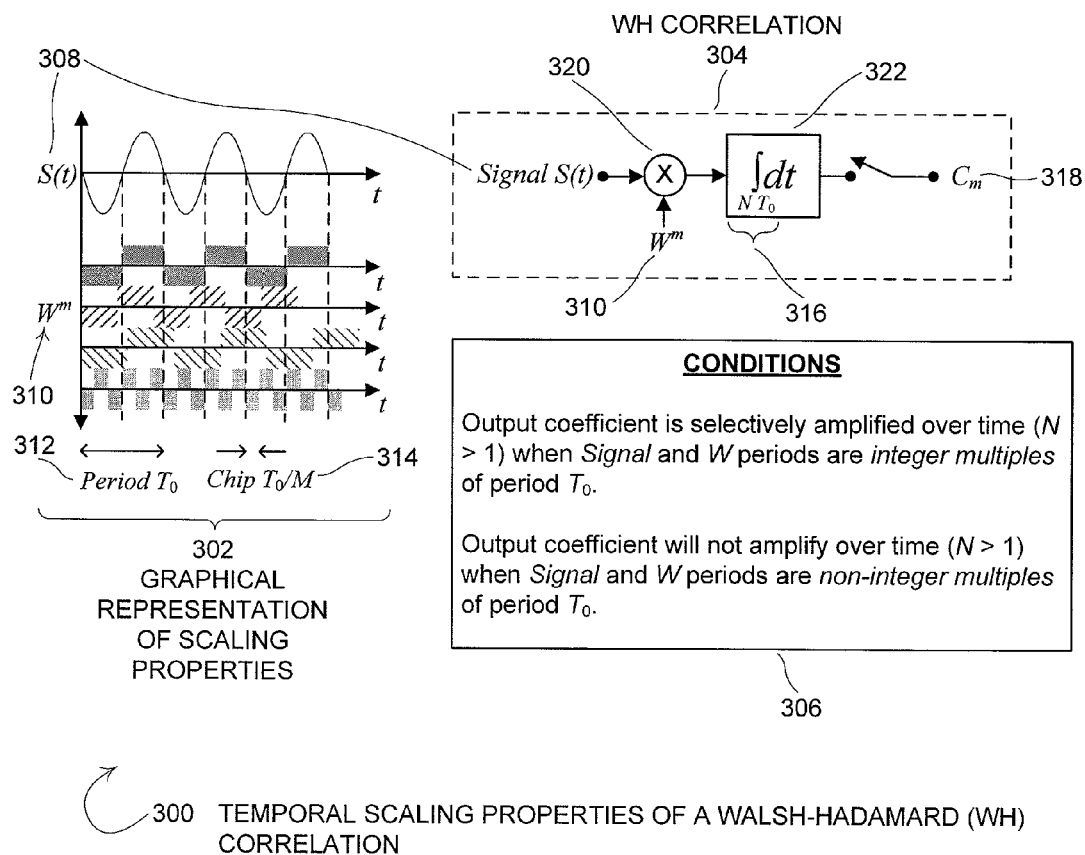
FIG. 3 is an illustration of temporal scaling properties of a WH correlation of an embodiment.

FIG. 3 is an illustration of temporal scaling properties 300 of a WH correlation of an embodiment. The time-scaling properties 300 inherent in WH correlators 304 are important aspects of time-domain sampling systems. The basic variables governing temporal response are defined as follows.

$T_O$ (312) is the total amount of time (e.g., period) required to correlate a single Walsh sequence (vector) $W^m$.

M is the length, or number of available time slots, of the binary vector, $W^m$.

The maximum rate at which the vector $W^m$ changes binary state is the chipping rate, $M/T_O$.

Conversely, the time slot of a single chip or chip period is $T_O/M$ (314)

N is the number of times the vector $W^m$, of period $T_O$ (312), is sequentially correlated before $C_m$ (316) is sampled.

Likewise, the total integration window is given by $N\,T_0$ (316), where N is the integer number of times the period $T_0$ (312) is repeated, N=1, 2, 3. . . .

In accordance with the conditions shown in 306 and graphically represented in 302, two different types of behavior are evident for N=1 and N>1. For N=1, a WH correlation process is a divide by M sampler. That is, provided the chipping rate equals or exceeds the Nyquist rate of the signal S(t) 308, the ADCs may be operated at a rate M times slower than the Nyquist rate without any signal capture loss. This follows from the orthogonal and completeness properties of Eq. 3 and Eq. 4 of the $W^m$ 310. On the other hand, when N>1, the WH correlator 304 behaves as a time-domain filter where the $C_m$ 318 are amplified or attenuated over $N\,T_0$ 316 depending on whether the signal S(t) 308 and the $W^m$ 310 periods are integer or non-integer multiples of $T_0$ 312. For the case of integer multiples, the multiplier 320 output is a constant voltage or current, which when integrated 322 over $N\,T_0$ 316 is amplified by N. For the case of non-integer multiples, the temporal mismatch between the signal S(t) 308 and the $W^m$ 310 results in an oscillating error, which when integrated 322 will not be amplified. Summarizing, the correlation process behaves as a divide by M sampler when N=1, and an M-stage filter for N>1. In contrast to a conventional frequency-domain filter, a temporal filter is tuned by scaling $T_0$ 312, with selectivity determined by M and N.

Figure 4:
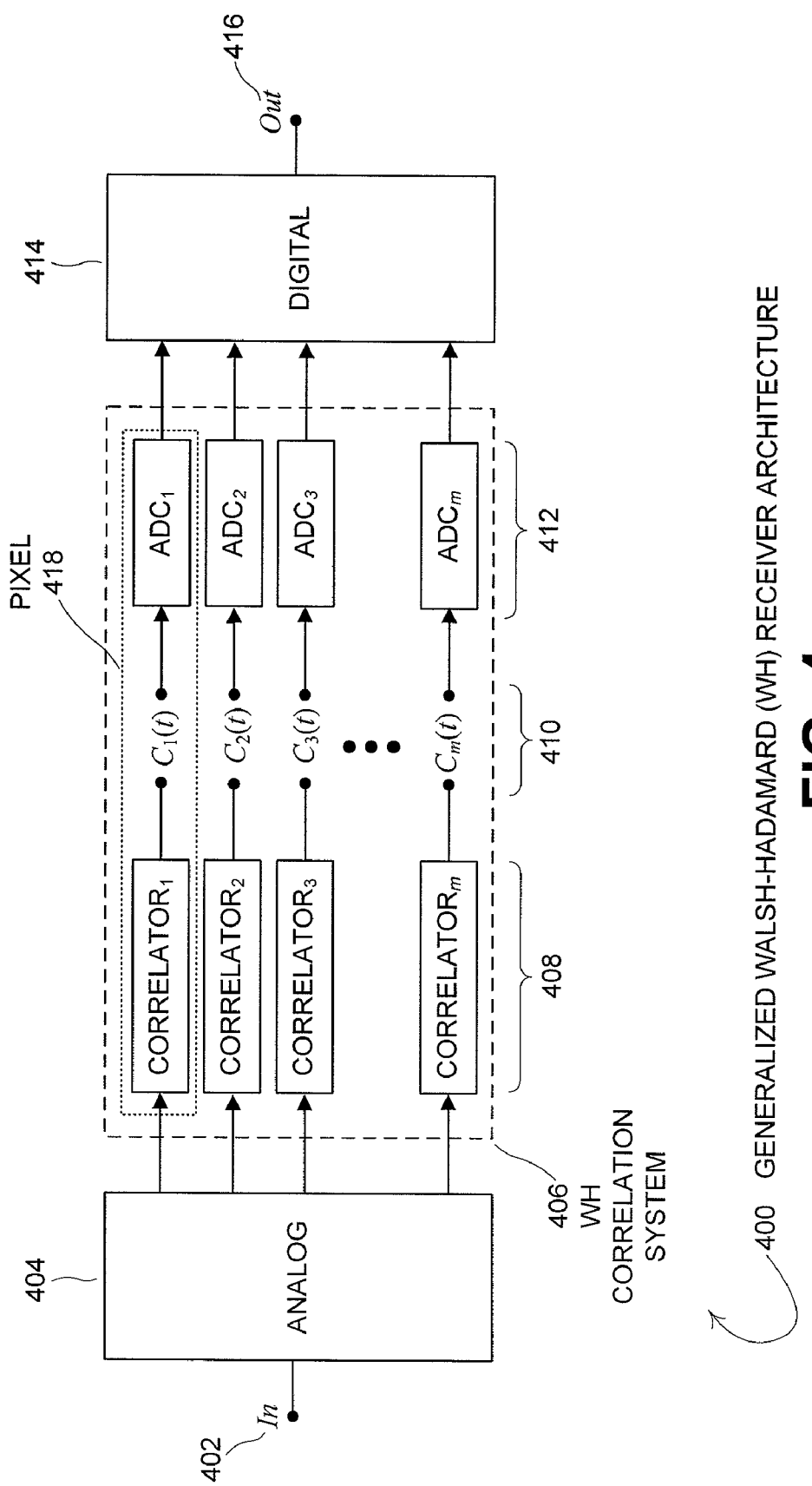
FIG. 4 is a schematic illustration of a generalized WH receiver architecture for an embodiment.

FIG. 4 is a schematic illustration of a generalized WH receiver architecture 400 for an embodiment. The receiver architecture 400 provides seamless bridging between the analog 404 and digital 414 domains enabling embodiments to provide software capable of multimodal acquisition including: multi-channel, range resolved, temporal, and 3-D acquisition modes. In operation, the generalized receiver architecture 400 receives a signal input 402 that is in analog form 404. As shown in FIG. 4, the signal input 402 may be an analog electrical signal representing an optical signal detected by a single square-law detector (see the disclosure with respect to FIG. 1). The analog signal 404 is passed to a WH correlation system 406 that processes the signal by passing the signal through a plurality of correlators 408 to decompose the input signal 402 into a corresponding plurality of correlation output coefficients $C_m$ 410. The plurality of correlation output coefficients $C_m$ 410 are passed through a corresponding plurality of Analog-to-Digital (ADC) converters 412 that digitize the $C_m$ 410 signals to permit the waveform to be operated on in the digital domain 414. Operations in the digital domain 414 may recompose the $C_m$ 410 signals into a digital output 416 representation of the waveform in one or more of a variety of detection (i.e., image) modes.

The M-Channel architecture 400 may be partitioned into P M/P-channel independently programmable sub-receivers, which may be particularly useful for multimodal imaging. Specifically, the WH architecture 406 remains valid for M=1, which is necessary for implementing multimodal imaging at the pixel 418 level for Focal Plane Arrays (FPAs). An FPA has a grid of pixel detectors. Each pixel of an FPA may be thought of as a single sub-receiver that receives a separate signal for the pixel. Each sub-receiver has a square-law detector to detect the optical signal received at a pixel. Thus, for a plurality of sub-receivers that are combined to make up a grid of pixels, there would be a corresponding plurality of square-law detectors combined to make up the grid of pixels for the FPA. The WH correlation is then performed separately, but in a coordinated fashion with regard to the WH basis functions, for each of the individual pixel sub-receivers such that each pixel has an individual pixel correlation output coefficient $C_m$ 410 for each of the WH binary basis functions (m=1,2...M).

While the output coefficients $C_m$ 410 may be different for each pixel, the WH binary basis functions used for the correlation calculation are shared for all pixels in the grid of pixels. That is for each m of m=1,2...M, the correlation calculation at each pixel uses the same WH binary basis function. The result for each correlator m for the grid of pixels of an FPA is an array of $C_m$ 410 for each correlator such that there are M arrays of $C_m$ 410 for the overall result of the WH correlation on the grid of pixels of the FPA.

For some sensors, the pixel 418 level signal may be sent serially (i.e., sequentially) or in parallel. The multiple correlators 408, coefficients 410, and ADCs 412 represent a system that may have parallel processing paths for each pixel 418 to process each pixel 418 simultaneously. For many of the sensors available today, the pixel signals are sent serially such that each pixel 418 uses the serial communication bus one-at-a-time to send the pixel 418 and then turns the communication bus over to the next pixel. For serial systems, one WH vector ($W^m$) is correlated at a time over the entire focal plane array of pixels, with each pixel simultaneously correlating the pixel's signal with the $W^m$. The incoming optical signal needs to be cyclo-stationary for a serial implementation since the WH vectors ($W^m$) are correlated one at a time instead of all at once. Reading out the sensor array results in an array of $C_m$'s with a unique $C_m$ for each pixel corresponding to the signal incident on that pixel. Serially repeating the process for each of the m=1, 2, . . . M WH Vectors, generates M arrays of correlation coefficients uniquely corresponding to each WH vector $W^m$ with a unique $C_m$ for each pixel corresponding to the signal incident on that pixel. There may still be multiple correlators, but each correlator is implemented with the same sub-system/sub-process. The results of each serially processed coefficient array may be stored in the digital domain 414 for operations on the coefficients 410 as a whole once all WH vectors have been serially processed. In a serial system, the multiple correlators 408 and coefficients 410 are separated by time and not as concurrently separate systems/processes, but the conceptual design of the WH correlation is the same. A system may provide additional integrators, switches and ADCs for each pixel to permit each pixel to simultaneously calculate multiple correlation output coefficients $C_m$ 410 via multiple WH correlations using the multiple corresponding WH binary basis functions.

Figure 5:
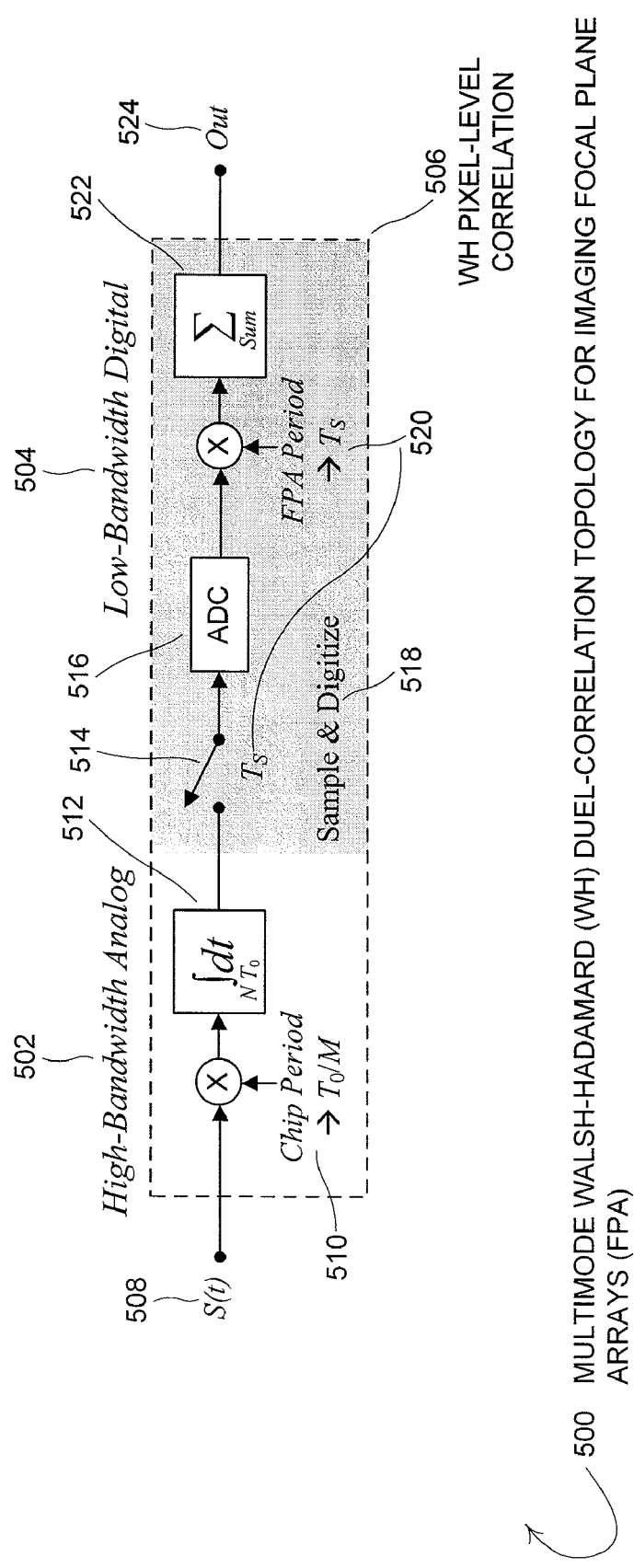
FIG. 5 is a schematic illustration of a multimode WH duel-correlation topology for Focal Plane Arrays (FPAs) for an embodiment.

FIG. 5 is a schematic illustration of a multimode WH duel-correlation topology 500 for Focal Plane Arrays (FPAs) for an embodiment. The WH duel-correlation topology 500 is implemented at the pixel level such that there is an instance of the WH pixel-level correlation 506 for each pixel of an FPA. In the embodiment illustrated in FIG. 5, the input signal S(t) 508 is a high-bandwidth analog signal that is first handled in the high-bandwidth analog section 502 of the pixel-level WH correlation 506. The high-bandwidth analog section 502 integrates 512 the input signal 508 to perform a WH correlation (first WH correlation in dual-correlation systems) with a chip period 510. The results of the integration 514 are then sampled and digitized 518 via switching 514 at the FPA. The sampling of the correlated (i.e., integrated) high-frequency signal is performed at the FPA frame rate such that the period of sampling is the FPA period $T_S$ 520. The Analog-to-Digital Converter (ADC) 516, in the low-bandwidth digital section 514 of the WH pixel-level correlation 506, digitizes the sampled signal for processing in the low-bandwidth digital section. The output of the ADC 516 may then be operated on to perform various image mode processing to provide different image mode results (i.e., multimode results) from the same/common FPA detector based on the same cyclo-stationary optical signal S(t) 508. The additional processing in the low-bandwidth digital section 504 may involve a second (i.e., dual) correlation of the signal to separate the optical channels. The digital output of the ADCs may be summed 522 together to make a combined output signal 524, or the system may process the digital outputs of the ADCs 516 prior to summing 522 to create a combined output signal 524. In some scenarios, it may also be desirable to deliver the output of the image processing without performing the summing process 522.

The pixel-level implementation 506 of the topology 500 enables implementation of correlation based compression and programmable imaging modalities, including: multi-channel access, temporally resolved imaging, range slicing, and 3-D. Other types of imaging modalities that would benefit from the type of correlation and bridging between analog and digital domains may also be implemented in various embodiments.

A central concept for the binary correlation processes is the concept of compression, also known as processing gain. Generally, signal compression is a process that enables the acquisition of high-frequency signals at significantly lower sample rates without information loss. Simplistically, the compression gain of the WH topology 500 may be expressed as the ratio of the high-bandwidth 502 to the low-bandwidth 504, or in terms of period, as the FPA period/frame rate $T_S$ 520 to the chip period $T_0/M$ 510 (i.e., $T_S/(T_0/M)$). Of importance for imaging applications, compression permits the detection and acquisition of high speed signals ($T_0 \sim 1$ ns) with significantly slower Focal Plane Array (FPA) readout rates ($T_S \sim 0.1$ sec). Further, as compression gain follows from general spread-spectrum communications concepts, high detection signal-to-noise ratios, high background rejection-ratios, and efficient speckle mitigation is achievable. In the correlation topology 500 illustrated in FIG. 5, the temporal and range resolution, detection signal-to-noise ratio, speckle signal-to-noise ratio, and background-rejection ratio scale with compression gain may be described as follows:

Compression Gain:

$$G_c \propto \frac{MN^{T_s}}{T_0}$$

Temporal/range resolution (c=speed of light):

$$\Delta t \propto T_0, \Delta r \propto \frac{cT_0}{2}$$

Detection signal-to-noise: $SNR_{Det} \propto \sqrt{G_c SNR_{DetSingleChip}}$
Speckle reduction: $SNR_{Spkl} \propto \sqrt{G_c SNR_{SpklSingleChip}}$
Background rejection:

$$Bkg_{rr} \propto \frac{1}{G_c}$$

Note that speckle mitigation is based on exploiting the integration of de-correlated speckles over the length of the M N binary sequence. Speckle mitigation is possible with spread-spectrum (dual-correlation) architectures because the transverse phase of each transmitted pulse may be spatially modulated to provide statistically independent speckles at the receiver. Correlation over these M N pulse sequences effectively averages the speckle resulting in speckle Signal-to-Noise Ratio (SNR) improvements proportional to the square-root of the compression gain. The process works down to very low photon rates. Generation of de-correlated speckles may be accomplished with a mechanical diffuser wheel, acoustic modulation of oversized optical fibers, spatial-phase modulation (e.g., electro-optic SLM—Spatial Light Modulator—arrays), switched Micro-Electro-Mechanical devices (MEMs), etc. Additionally, the expression for "Background rejection" given above is a worst case scenario based on implementation of pseudorandom binary sequences (see disclosure with respect to FIGS. 9-13 below). When orthogonal WH binary sequences are employed, channel separation and background rejection are significantly improved.

FIG. 6A-D are schematic illustrations of various switched topologies 602, 604, 606, 608 compatible with conventional UltraViolet (UV), Visible (Vis), and InfraRed (IR) imaging topologies employed in the synthesis of correlation detection processes for an embodiment. FIG. 6A is a schematic illustration of a gated Intensified-Charge Coupled Device (ICCD) topology 602. FIG. 6B is a schematic illustration of a mono-polar switched Focal Plane Array (FPA) topology 604. FIG. 6C is a schematic illustration of a bipolar switched FPA topology 606. FIG. 6D is a schematic illustration of a tristate switched FPA topology 608. The topologies 602, 604, 606, 608 illustrated in FIGS. 6A-D represent the topologies most likely to be implemented in an embodiment, but other topologies with similar characteristics may also be used. The illustrated topologies 602, 604, 606, 608 compatible with conventional focal plane technologies include: a typical, commercially available Intensified-Charge Coupled Device (ICCD) camera 602; a mono-polar switched FPA 604; a bipolar switched FPA 606; and a tristate switched FPA 608. Each of the Bipolar 606 and tristate 608 switching enables high background rejection, extended dwell times, and temporal filtering. Each of the topologies 602, 604, 606, 608 include a switch 610 and an integrator 612 as is needed to implement the WH pixel-level correlation described in the disclosure with respect to FIG. 5.

An example embodiment may employ an ICCD camera 602 capable of 10 ns gating speeds at 5 kHz repetition rates and having 1 to 100 Hz readout rates. While ICCD cameras 602 are readily available, the ICCD cameras 602 are spectrally limited to UltraViolet (UV) through Near-Infrared (NIR). Alternative switched Capacitive-TransImpedence-Amplifier (CTIA) topologies are illustrated in 604, 606 and 608. Key advantages of the switched CTIA topology 604, 606, 608 include compatibility with UV through Long-Wave InfraRed (LWIR) hybrid technologies, and when not needed, the switching mode may be disabled without interfering or affecting conventional focal plane operations. Complementary Metal Oxide Semiconductor (CMOS) CTIA readouts are projected to be capable of providing 1 to 100 ns switching speeds depending on detector technology and CMOS fabrication process technology.

Bipolar and tristate correlation based on bipolar 606 and tristate 608 CTIA topologies are particularly interesting for implementing the full compliment of WH correlation processes. Mathematically, a bipolar scheme (1, −1) switches between "add" (1) and "subtract" (−1), whereas a mono-polar (1, 0) scheme switches between "add" (1) and "not-add" (0). Bipolar correlation improves the detection and extraction of weak cyclo-stationary signals in high background and clutter environments via bipolar averaging at the pixel level. Tristate correlation (−1, 0, 1) includes the "0" ground state (e.g., "not-add") disconnecting the potentially noisy detector for low duty-cycle pulse sequences.

Figure 7:
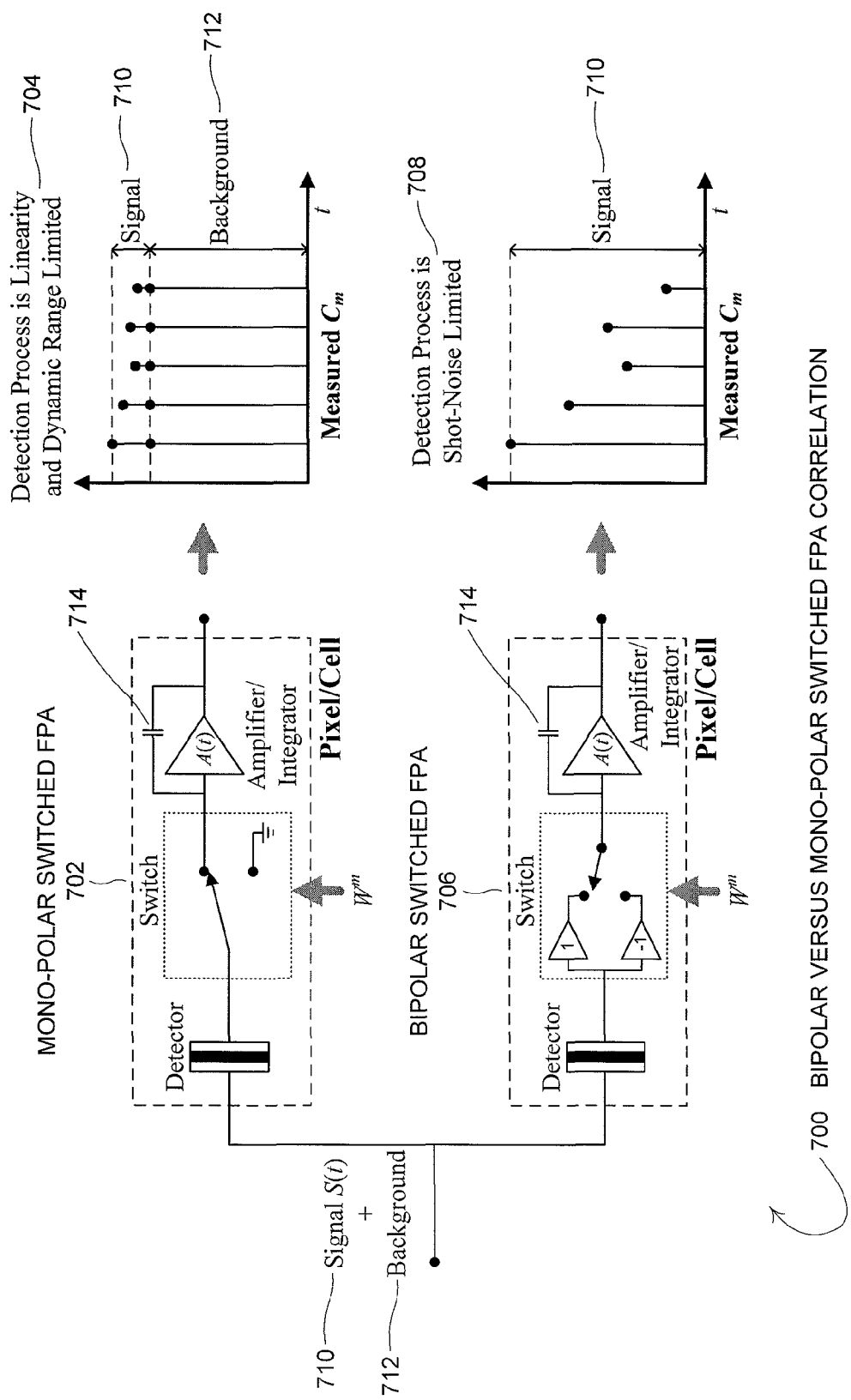
FIG. 7 is a schematic illustration of a comparison of bipolar switched FPA correlation and a Mono-polar switched FPA correlation.
Figure 8:
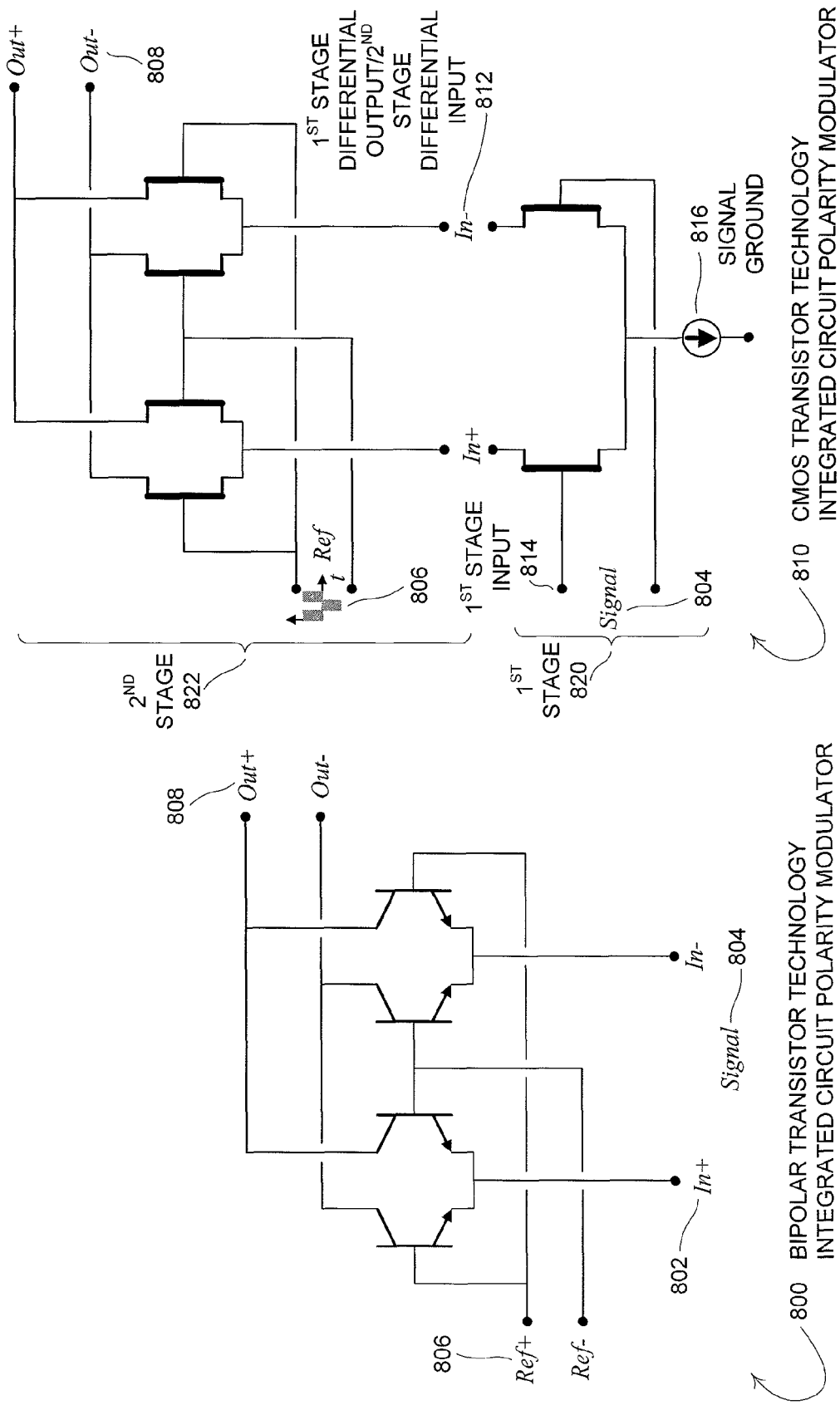
FIG. 8A is a schematic illustration of an integrated circuit for a polarity modulator based on bipolar transistor technology.
FIG. 8B is a schematic illustration of an integrated circuit for a polarity modulator based on Complementary Metal Oxide Semiconductor (CMOS) transistor technology.

FIG. 7 is an illustration 700 of a comparison of bipolar switched FPA 706 correlation and a Mono-polar switched FPA 702 correlation. The mono-polar detection process 702 is typically linearity and dynamic range limited 704 in high background 712 environments, while the bipolar process 706 is capable of cancelling the background 712 via correlated double sampling and selectively integrating (e.g., WH filtering as described in the disclosure with respect to FIG. 3) over the desired signal 710. Bipolar correlation 706 improves detection, filtering, and extraction of weak cyclo-stationary signals 710 in high background and clutter 712 environments. Bipolar correlation 706 is configurable to cancel cyclo-stationary background and clutter 712 and integrate over selected signals 710. Note that bipolar correlation 706 is not capable of cancelling or reducing detector shot (photon) noise 708. However, with the rejection of background and clutter 712, long integrations over targeted signals resulting in high signal-to-noise ratios are possible for extraction of weak signals.

FIG. 8A is a schematic illustration of an integrated circuit 800 for a polarity modulator based on bipolar transistor technology. In the bipolar transistor polarity modulator circuit 800, the signal 804 is received by the bipolar transistor circuit 800 at input 802. The bipolar circuit 800 multiplies the signal 804 by the reference signal 806 and provides a polarity modulated output 808.

FIG. 8B is a schematic illustration of an integrated circuit 810 for a polarity modulator based on CMOS transistor technology. Similar to the bipolar transistor circuit 800 of FIG. 8A, the CMOS polarity modulator circuit 810 receives the signal 804, multiplies the signal 804 with the reference signal 806 and provides a polarity modulate output 808. The CMOS circuit 810 is different in that there are two circuit stages, 820 and 822. Thus, the signal 804 is received at the first stage 820 at input 814. The first stage 820 provides a differential output 812 relative to signal ground 816 that is used as the differential input 812 to the second stage 822 that performs the polarity modulation to create the polarity modulated output 808.

The polarity modulated output 808 of either the bipolar transistor 800 or CMOS transistor 810 polarity modulation circuits provides the polarity modulation output 808 before current mirroring and integration on the feedback capacitor (see feedback capacitor 714 illustrated in FIG. 7). Both the bipolar transistor 800 and CMOS transistor 810 polarity modulation circuits provide polarity modulation using all solid state technology, meaning no inductors and the potential for dense integration permitting miniaturized transceivers and imaging arrays.

The topology of a multimode image acquisition and processing system based on a common sensor as described in the disclosure with respect to FIGS. 1-8 permits various embodiments to detect fast optical signals with slow-readout Focal Plane Array (FPA) technology such that each pixel in the array is enabled to act as a programmable receiver. The disclosure with respect to FIGS. 9-13 discusses application of the multimode image acquisition and processing system based on a common sensor to specific imaging modes, including: multi-channel access imaging, range slicing imaging, temporal imaging, and three-dimensional (3-D) imaging. Other imaging modes may also be implemented with the multimode image acquisition and processing system, but the four specific image modes discussed in the disclosure with respect to FIGS. 9-13 are considered to be the most commonly desired imaging modes. As is evident in the disclosure with respect to FIGS. 9-13, the four discussed imaging modes are readily synthesized through a common sensor by re-programming the correlation algorithms in the digital domain. Other imaging modes may also be implemented through the common sensor by re-programming the correlation algorithms in the digital domain to produce the additional imaging mode results.

Figure 9:
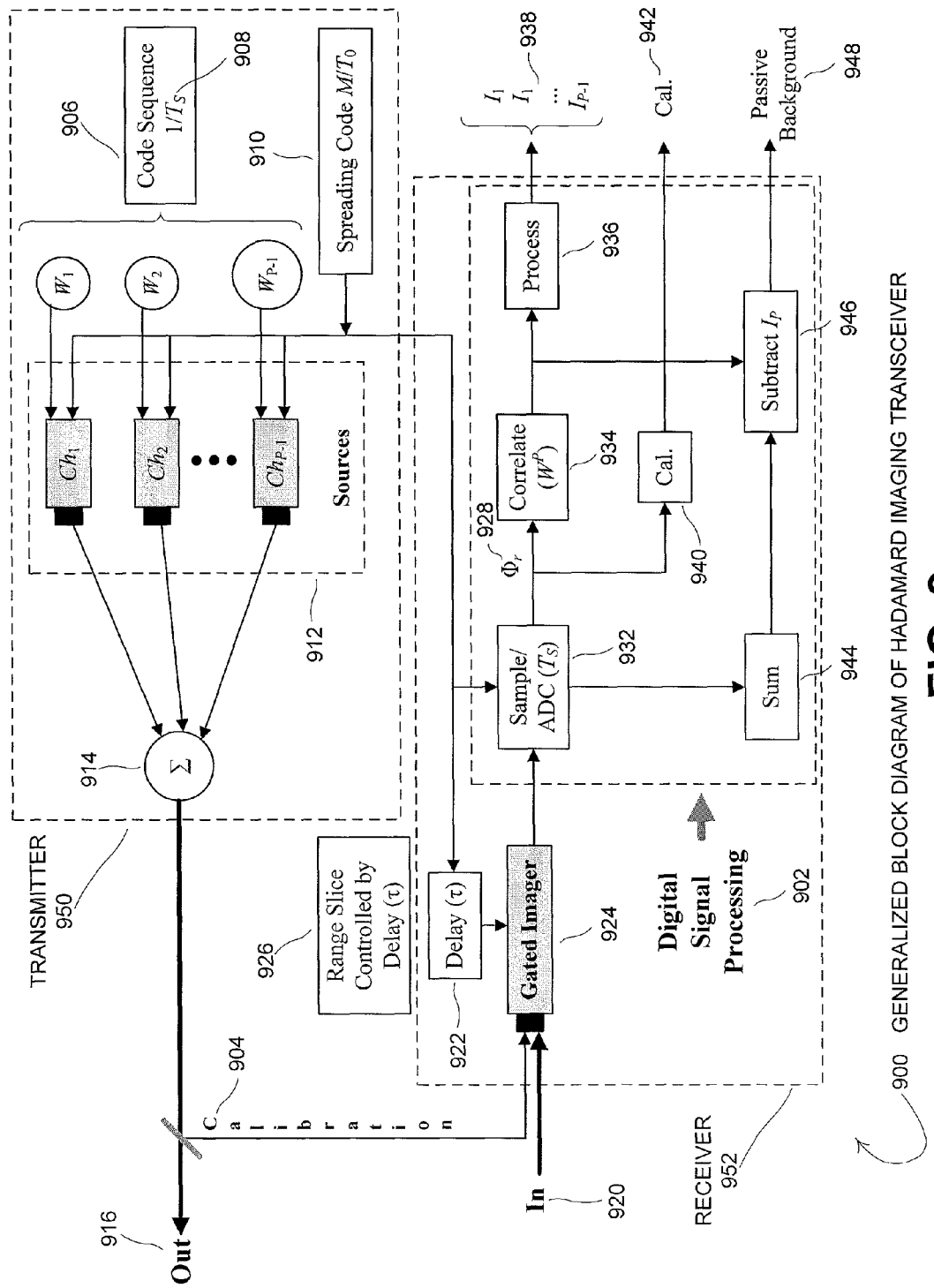
FIG. 9 is a schematic illustration of a generalized block diagram of a Hadamard imaging transceiver for an embodiment.

Hadamard imaging technology may allow for both high information dimensionality and intrinsic multi-mode data fusion via a single common agile sensor. When embedded within a reconfigurable computing/algorithm architecture, Hadamard imaging technology may provide a compact, flexible system that is uniquely capable of providing real-time quantitative information on a broad set of detection activities FIG. 9 is a schematic illustration of a generalized block diagram of a Hadamard imaging transceiver 900 for an embodiment. The Hadamard imaging transceiver 900 illustrated in FIG. 9 has features that may be necessary for implementing a multi-channel access imaging mode (e.g., the second WH correlation at 934) and/or for implementing a range slicing imaging mode (e.g. the time-delay features at 922 and 926). While the some of the signal processing 902 may vary, the general features of the Hadamard transceiver 900 may be utilized for other imaging mode processing, including for temporal imaging and 3-D imaging. For non-multi-channel based imaging modes, it may not be necessary to ensure the orthogonal relationship between the baseband code sequences 906 and the correlating code sequences used in the second (i.e., dual) correlation at 934 as other imaging modes may not require that the individual channels/sources 912 be separated to achieve the desired imaging mode results.

Figure 10:
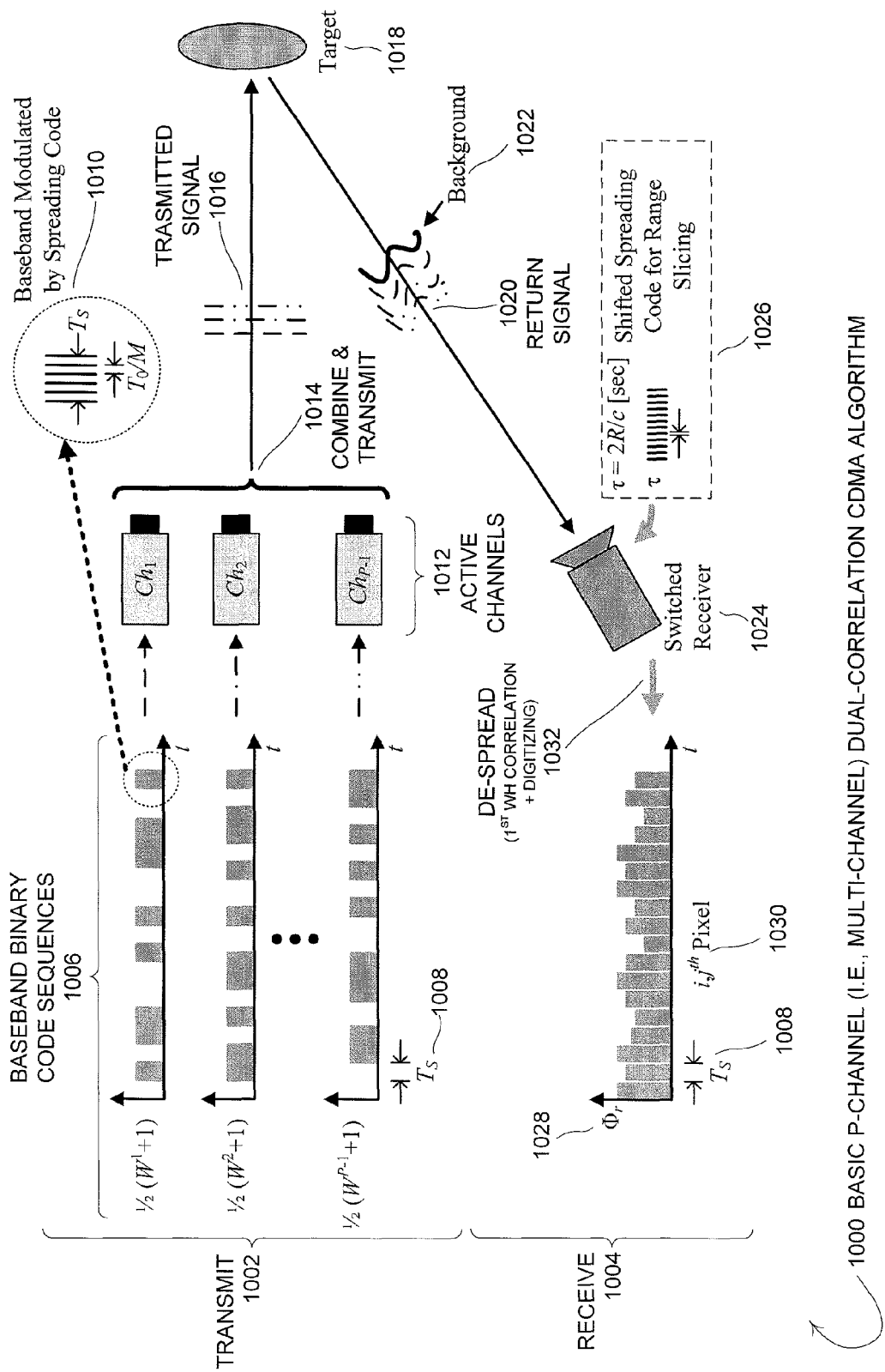
FIG. 10 is an illustration of operation of a basic P-channel (i.e., multi-channel) dual-correlation Code Division Multiple Access (CDMA) algorithm for an embodiment.
Figure 11:
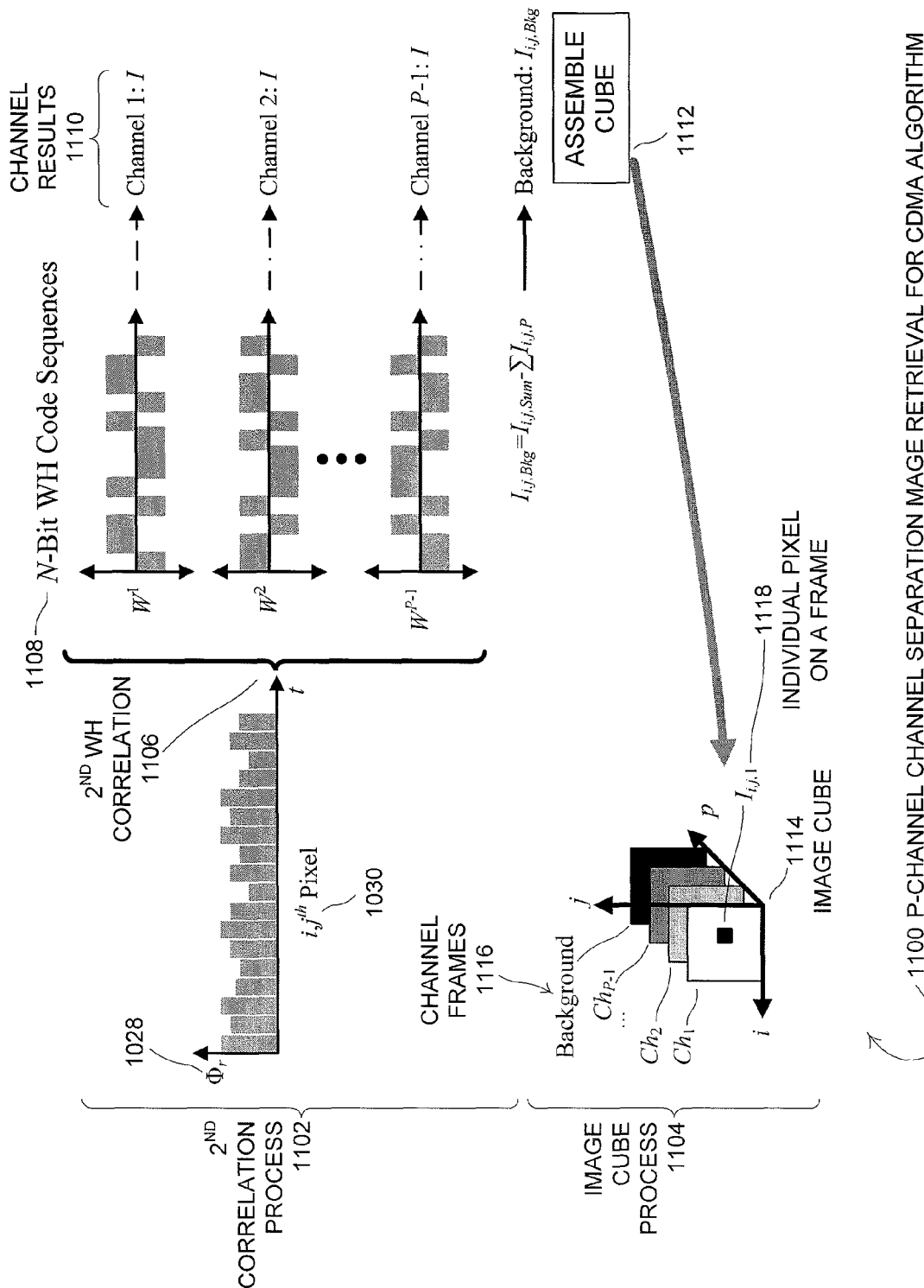
FIG. 11 is an illustration of channel separation image retrieval operation for a P-channel CDMA algorithm for an embodiment.

As is also described in the disclosure with respect to FIGS. 10-11, a multimode embodiment including a multi-channel access imaging mode generates binary code sequences 906 (i.e., $W^{P-1}$) in a transmitter portion 950 of the Hadamard transceiver 900 that may be orthogonally matched to the WH binary basis sequences used in the secondary correlation performed at 934 in a receiver portion 952 of the Hadamard transceiver 900 to ensure optimal correlation for the channel separation in the digital signal processing section 902. The WH code sequences 906 are based on the gated imager 924 readout rate ($1/T_S$) 908 and have a period of $T_S$. The optional high-frequency spreading code 910 may be modulated into the optical signal of the sources 912 at the transmitter 950 for a system utilizing dual (i.e., secondary) correlation. The high-frequency spreading code 910 is also sent to the receiver 952 of the Hadamard transceiver 900 to synchronize the correlation between the high-frequency spreading code 910 at the transmitter 950 and the first correlation with the incoming/reflected optical signal 920 at the receiver 952. Note that for a range slicing application, the high-frequency spreading code 910 sent to the receiver may be time-delayed 926 by τ 922 for a range slicing image mode. It is also desirable to synchronize the WH code sequences 906 with the orthogonal binary basis sequences used in the secondary correlation performed at 934. The high-frequency spreading code 910 is not necessary for imaging mode embodiments that do not require dual correlation (e.g., temporal imaging). The optical output of the channels/sources 912 is then combined at optical summer 914, which may be implemented via an appropriate optical beam combining system. The output/transmitted signal 916 is then directed at a desired target(s). The output signal may also be diverted directly to the gated imager 924 for calibration purposes 904. As necessary for calibration, the calibration signal 904 may be handled alone or simultaneously with the return input signal 920 from the target(s).

The return input signal 920 is received by the gated imager 924 after reflecting off of the target(s) and being combined with background noise and clutter. The gated imager may be a switched Focal Point Array (FPA) device of a topology as described in the disclosure with respect to FIG. 6 that implements a pixel-level WH correlation system as described in the disclosure with respect to FIG. 5. Via the pixel-level WH correlation system (see disclosure with respect to FIG. 5) implemented at the gated imager 924, a first WH correlation is performed in a high-frequency analog bandwidth to correlate the input signal 920 with the synchronized reference spreading code 910 sent from the transmitter 950 to the receiver 952. The ADCs at 932 sample the first WH correlation output from the gated imager 924 at the readout rate of the gated imager (i.e., at a period of $T_S$), to create a digital frame data cube $\Phi_r$ 928 representing the overall intensity of the combined input signal 920 at each pixel of the FPA gated imager 924. The digital frame data cube $\Phi_r$ 928 output from the ADCs 932 may be used to derive the individual pixel-level channel intensities of the digital image cube results 938, a calibration output 942, and/or to obtain the pixel-level intensities of the passive background channel ($I_{i,j,Bkg}$) 948. To obtain the multi-channel access image cube results 938, the digital frame data cube $\Phi_r$ 928 is WH correlated a second time at 934. The WH basis functions for the second correlation at 934 should be orthogonal to the baseband WH code sequences 906 injected into the various channels in order to assure optimal channel separation. The secondary (i.e., dual) WH correlation 934 separates the individual channel intensities for each channel from the overall channel intensity for each pixel contained in the digital frame data cube $\Phi_r$ 928. Thus, a digital data cube 938 containing the pixel-level intensity for each channel may be constructed via processing at 936. For calibration, the digital frame data cube $\Phi_r$ 928 may be processed at a calibration process 940 to create the calibration output 942. The digital frame data cube $\Phi_r$ 928 output of the ADCs 932 may also be used to obtain the passive background channel intensity for each FPA pixel 942 by summing 944 the output of the entirety of the channels and then subtracting the combined output of the "P–1" channels at 946.

As noted above, the general architecture of the Hadamard transceiver 900 illustrated in FIG. 9 may be utilized to obtain other types of imaging mode results than the results specifically discussed in the disclosure with respect to FIG. 9. Essentially, other imaging modes may be implemented by utilizing the digital frame data cube $\Phi_r$ 928 output from the ADCs 932 and then performing other types of digital signal processing 902 on the digital frame data cube $\Phi_r$ 928. Further, since the digital frame data cube $\Phi_r$ 928 is in digital form, the digital frame date cube $\Phi_r$ 928 may be shared amongst various processes on a digital system (i.e., a computer, a network of computer systems, a programmable hardware device, or other digitally programmable device/system). Thus, a single physical system with a single common gated imager (i.e., a single common sensor) may simultaneously process and deliver multiple imaging modes (i.e., a real-time, simultaneous multimode transceiver).

FIG. 10 is an illustration of operation 1000 of a basic P-channel (i.e., multi-channel) dual-correlation Code Division Multiple Access (CDMA) algorithm for an embodiment. Multi-channel access imaging is based on modern direct-sequence or Direct-Sequence Spread-Spectrum (DSSS) Code Division Multi-Channel Access (CDMA) communication technologies. Multi-channel access is a fundamental multimode building block because multi-channel access permits the simultaneous acquisition of passive and active images through a single sensor without optical filtering, scanning, or other moving parts. Unlike pseudorandom code sequences employed in digital communications, the orthogonal Walsh-Hadamard sequences discussed in the disclosure with respect to FIGS. 1-8 enable optimal detection efficiencies—up to and including the maximum achievable 50% throughput.

P-channel correlation operation 1000 may be divided into a transmit section 1002 and a receive section 1004 in order to simplify discussion. In the transmit section 1002, baseband binary code sequences 1006 of the "P–1" channels 1012 are multiplied/modulated by high-frequency spreading code 1010 to enable a dual-correlation system. The baseband binary sequences 1006 need to incorporate Walsh-Hadamard (WH) orthogonal characteristics. The high-frequency spreading code 1010 used for the dual-correlation does not necessarily need to incorporate WH characteristics, but does need to be common to all channels. In a single correlation system, modulating the baseband binary sequences 1006 with the "secondary" high-frequency spreading code 1010 is not necessary. At 1014, the individual "P–1" channels 1012 are optically combined and transmitted as a single optical signal 1014 to the target 1016 via an appropriate optical beam combining system. In the receive section 1004, the target 1018 reflects the transmitted optical signal 1016, plus an additional, passive background channel 1022, as a return signal 1020 to the switched receiver 1022. Note that the $P^{th}$ channel is typically reserved for the passive background channel 1022. The optical return signal 1020 is received and converted to an electrical signal at the switched receiver 1024. The high-frequency optical return signal 1020 is de-spread 1032 to frame-rate baseband by employing one of the switching topologies described in the disclosure with respect to FIG. 6. The de-spread operation 1032 performs a first WH correlation on the return signal 1020 with respect to a copy of the spreading sequence 1010 synchronized between the transmission 1002 and the reception 1004. The first WH correlation may be performed as described in the disclosure with respect to FIG. 5 by utilizing the integrating and switching capabilities of the switched receiver 1024 as described in the disclosure with respect to FIG. 6. The de-spread operation 1032 may also digitize the de-spread results of the first WH correlation using ADCs sampling at the frame/readout rate of the FPA switched receiver 1024 (i.e., at a period of $T_S$ 1008). Note that by time delaying the synchronized reference spreading sequence 1026, a range "slice" corresponding to the range may be acquired. After de-spreading (i.e., first correlation and digitization) 1032 the return signal 1020 the resulting signal is now an FPA data array $\Phi_r$ 1028 (a P-frame data cube) representing the return signal 1020 detected at each i,$j^{th}$ pixel 1030 of the switched receiver 1024 as the return signal was correlated with the synchronized reference spreading code 1010.

Implementation of an optimal P-channel multi-access system requires binary sequences whose inner products are orthogonal. Eq. 5 below, derived in accordance with Eqs. 3 and 4, produces the proper orthogonal sequences.

$$\frac{1}{M}\langle W^p, W^{p'}\rangle = \begin{pmatrix} 1 & p = p' \\ 0 & p \neq p' \end{pmatrix}, \quad p = 1, \ldots P \qquad \text{Eq. 5}$$

In Eq. 5, $W^P$ is a Walsh sequence (vector) representing the $p^{th}$ channel, P is the total number of independent Walsh vectors, and hence, the total number of user channels available, and M is the length of the Walsh sequence. Eq. 5 represents the underlying mathematical basis for Walsh-Hadamard (WH) CMDA, which permits multiple active sources (e.g., laser, Light Emitting Diode—LED, etc.) and passive background to simultaneously share a common optical spectrum. As illustrated in FIG. 10, the processes for preparation and transmission of "P−1" active channels 1012 may be summarized as follows.

Each optical source/channel 1012 is assigned a unique Walsh baseband code sequence, $W^P$ or the orthogonal result of Eq. 5, of pulse width (time slot), $T_S$ 1008, which may correspond to the receiver frame/readout rate.

For dual-correlation, the "P−1" channel baseband sequences 1006 are synchronously multiplied by a length M high-frequency spreading code 1010 of pulse width $T_0/M$. The high-frequency spreading code 1010 does not necessarily need to follow WH principles, but does need to be common to all channels 1012. No secondary spreading code 1010 is necessary for single-correlation embodiments.

The "P−1" active channels 1012 are optically combined and transmitted to the target via an appropriate optical beam combining system.

At this point, the "spread-spectrum" nature of the process becomes apparent. For $T_S \gg T_0$, the resulting frequency bandwidth of the transmitted sequence has been increased by the compression factor $T_S/T_0$ over the baseband sequence 1006. Recall from above that high compression factors are desirable because of improvements to signal-to-noise ratio and background rejection. Compression gains of greater than a million-to-one have been demonstrated with spread-spectrum systems. Note that Eq. 5 suggests a need to transmit a bipolar sequence. Assuming complementary bipolar reference sequences in accordance with Eq. 5 are applied during the retrieval sequence as further described in the disclosure with respect to FIG. 11, the inherent symmetry of Walsh functions enables the implementation of mono-polar transmission sequences.

FIG. 11 is an illustration of channel separation image retrieval operation 1100 for a P-channel CDMA algorithm for an embodiment. FIG. 11 picks up where FIG. 10 leaves off and performs a second correlation process 1102 in order to assemble 1112 an image cube 1104 in an image cube process 1104. Utilizing the FPA data array $\Phi_r$ 1028 (a P-frame data cube) representing the return signal 1020 detected at each i,j$^{th}$ pixel 1030 of the switched receiver 1024, a second WH correlation 1108 is performed in the digital domain. For the second WH correlation, the WH correlation basis sequences 1108 should be orthogonal (i.e., complementary) to the baseband correlation sequences 1006 of FIG. 10 to permit optimal secondary (i.e., dual) correlation. After performing the second correlation, each of the P-channels 1110 is separated from the P-frame data cube $\Phi_r$ 1028 and the results may be assembled 1112 into a P-channel image cube 1114 with channel frames 1116 for each of the P channels, including the P$^{th}$ background channel. The P-channel image cube may be interpreted such that i and j indicate the FPA pixel and p indicates a selected channel such that an individual channel-pixel (i.e., individual pixel on a channel frame 1118) may be represented by the notation $I_{i,j,p}$.

The CDMA process results in a near-perfect spatio-temporal image cube registration of passive (i.e., background—1020 in FIG. 10) from active (i.e., 1012 in FIG. 10) channels. As described in the disclosure with respect to FIG. 10, and correspondingly to FIG. 5, the incoming optical signal is first "de-spread" (i.e., first WH correlation) (1032 in FIG. 10) to the original baseband Walsh sequence followed by exploiting the orthogonal properties of Walsh vectors for channel separation (see Eq. 5). As illustrated in FIG. 10 and FIG. 11, the P-channel retrieval process may be summarized as follows:

Capture the incoming optical signal S(t) (i.e., return signal 1020 of FIG. 10) with an optical aperture. The optical aperture may be comprised of a primary optical aperture that is focused onto the Focal Plane Array (FPA) via an optical secondary.

De-spread (i.e., 1032 of FIG. 10) the high-frequency optical signal to FPA frame/readout rate baseband by employing one of the FPA switching topologies as disclosed with respect to FIG. 6 to perform a first WH correlation of the return signal S(t) 1020 with a copy (aka. reference sequence) of the spreading sequence (i.e., 1010 of FIG. 10). Note that by time-delaying the injection of the reference spreading sequence by τ [sec], a range "slice" corresponding to the range R=τc/2 [m] with a resolution Δr a $T_0$ [m] is acquired (c [m/sec] is the speed of light).

Synchronously sample and digitize P consecutive image frames corresponding to the baseband Walsh sequence of pulse-width, $T_S$ (i.e., 1008 of FIG. 10). For example, sampling may occur at the receiver readout rate. Note that after the digitization process, the sampled P-frame data cube 1028 is digitized and stored in digital memory and capable of further processing, including for use in other types of image node processing (see also disclosure with respect to FIG. 5).

Retrieve the P-channel image cube channel information from the P-frame data cube $\Phi_r$ 1028 as sampled above through a secondary correlation with reference to the baseband functions $W^1, W^2, W^3, \ldots, W^{P-1}$. As noted above, the WH basis sequences (i.e., functions) 1108 in the second correlation should be orthogonal to the baseband binary code sequences (i.e., 1006 of FIG. 10). As illustrated in FIGS. 10 and 11, the secondary WH basis sequences 1106 at the receiver represent the Walsh sequence and the baseband binary code sequences 1006 at the transmit section 1002 represent the orthogonal/complement of the receiver WH basis sequences 1106. The representation of which of the receiver/transmitter sequences is the orthogonal/complement may be reversed as long as the sequences are orthogonal to each other.

Assemble 1112 the P-channel image cube 1114.

The retrieval of the P-channel image cube 1114 through the secondary correlation 1106 from the P-frame data cube $\Phi_r$ 1028 may be achieved through the algorithm described in Eqs. 6 and 7. For $I_{i,j,p}$ 1118 representing the intensity of the i,j$^{th}$ pixel on the p$^{th}$ frame, the channel intensity for the i,j$^{th}$ pixel is retrieved as described in Eqs. 6 and 7 below.

$$I_{i,j,1} = \frac{2}{M}\sum_{m=1}^{M} W_m^1 \Phi_{r_{i,j,m}}, \qquad \text{Eq. 6}$$

$$I_{i,j,2} = \frac{2}{M}\sum_{m=1}^{M} W_m^2 \Phi_{r_{i,j,m}},$$

$$\vdots$$

$$I_{i,j,P-1} = \frac{2}{M}\sum_{m=1}^{M} W_m^{P-1} \Phi_{r_{i,j,m}},$$

With a passive background preserved (e.g., the $P^{th}$ channel) as in Eq. 7 below.

$$I_{Bkg\,i,j} = \frac{1}{M}\sum_{m=1}^{M} \Phi_{r,j,m} - \frac{1}{2}\sum_{p=1}^{P-1} I_{i,j,p} \qquad \text{Eq. 7}$$

As described above with respect to a range "slice," the binary codes of the CDMA multi-channel embodiment described in the disclosure with respect to FIGS. 10 and 11 may be sequenced in a manner that provides narrow range resolution while preserving high signal-to-noise ratios (i.e., "range slicing" imaging mode). A range slicing imaging mode is useful for extracting target information that could be obscured and/or blinded by strong near-field or far-field backscatter. As described in the disclosure with respect to FIGS. 10 and 11, range slicing may be accomplished by time-delaying the injection of the reference spreading sequence by τ [sec] to create a range "slice" corresponding to the range R=τc/2 [m] with a range window width set by $T_0$ or Δr a $T_0$ [m], where c [m/sec] is the speed of light (see also 1026 on FIG. 10).

Figure 12:
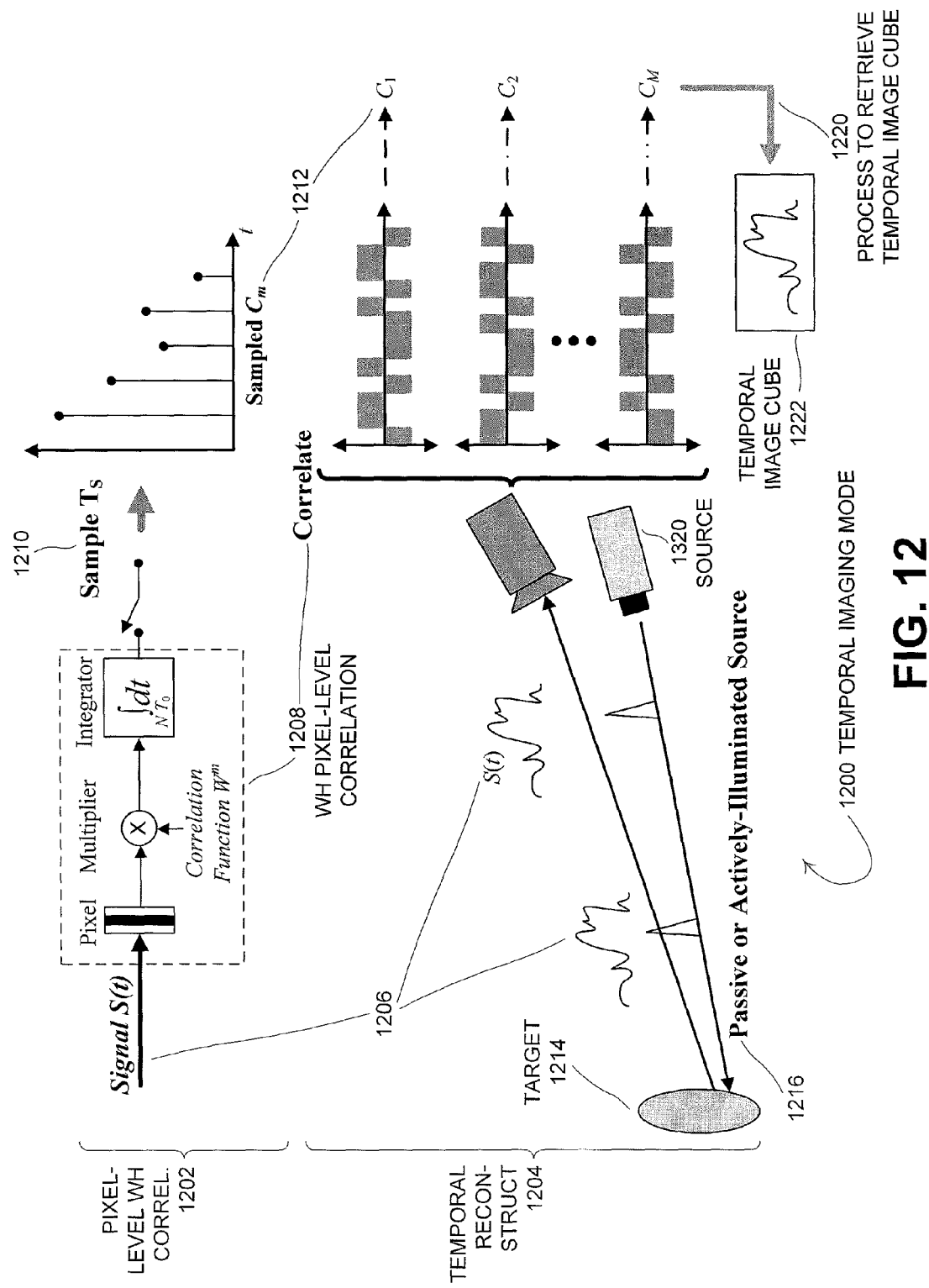
FIG. 12 is an illustration of operation of a temporal imaging mode embodiment.

FIG. 12 is an illustration of operation 1200 of a temporal imaging mode embodiment. In a basic form, temporal imaging is a WH decomposition algorithm (similar to a typical Fourier transform process) that enables slow frame-rate imagers to acquire high-frequency cyclo-stationary (periodic over the acquisition interval) signals at the pixel level without violating Nyquist sampling constraints. The illustration of operation for temporal imaging 1200 of FIG. 12 may be broken down into a pixel-level WH correlation section 1202 and a temporal reconstruction section 1204. The pixel-level WH correlation section 1202 illustrates the pixel-level WH correlation that is described in further detail in the disclosure with respect to FIG. 5. The temporal reconstruction section 1204 describes the process of correlating 1208 the input signal 1206 and the processing 1218 to create the temporal image cube result 1220 of temporal imaging mode processing 1222. The source 1220 may be passive or actively illuminated 1216. The input signal 1206 is returned from the target 1214 to the gated imager 1228. The cyclo-stationary input signal 1206 is received at the gated imager 1218, which may be one of the switched FPA topologies as described in the disclosure with respect to FIG. 6, and is WH correlated at the pixel level 1208 (see also the disclosure with respect to FIG. 5). The pixel-level WH correlation 1208 is then performed and digitally sampled 1210 with a period of $T_S$ to produce the WH projected output coefficients $C_m$ 1212 in the digital domain. The projected output coefficients $C_m$ 1212 are then digitally processed 1222 to invert the M-frame projected coefficient outputs 1212 of the WH correlation 1208 in order to produce a temporal image cube 1224.

As described in the disclosure with respect to FIGS. 1-8, the correlation 1208 of high-speed orthogonal Walsh vectors, $W^m$, with the cyclo-stationary input signal S(t) 1206 results in projection coefficients, $C_m$ 1212. By stepping sequentially through the vectors from m=1 to m=M, a compact representation of the temporal signal is generated and sampled 1210 at each pixel of the FPA gated imager 1218. Reconstruction of the waveform follows from inversion (see Eq. 4) of the projection coefficients $C_m$ 1212. Implementation of time-scalable bipolar correlation (see also the disclosure with respect to FIGS. 5-8) makes it possible to selectively program the imager 1218 to behave as a WH temporal filter that passes only temporal signals of interest and rejects unwanted background and clutter. A temporally selectively image 1218 with long integration sequences will improve low-level signature discrimination in high background and clutter environments. Note that long integration sequences improving low-level signature discrimination is true so long as the time-varying background clutter and the target signal 1218 remain cyclo-stationary over the observation period. Temporal image mode operation may be summarized as follows.

Capture the incoming cyclo-stationary optical signal, S(t) 1206, with an optical aperture. The optical aperture may be comprised of a primary optical aperture that is focused onto the Focal Plane Array (FPA) via an optical secondary.

Correlate the time-scaled Walsh vector, $W^m$, with signal S(t) resulting in projection coefficients, $C_m$ 1212. The WH correlation may be performed by employing one of the switching topologies described in the disclosure with respect to FIG. 6. As described in the disclosure with respect to FIGS. 1-8, temporal filtering may be controlled by time-scaling the sequence period $T_0$ and total integration window $NT_0$, where N is the integer number of times the sequence period $T_0$ is repeated (e.g., N=1, 2,3).

Sequentially sample and digitize the M consecutive image frames containing projection coefficients $C_m$ 1212 corresponding to the time-scaled Walsh vectors, $W^m$, m=1, 2, ..., M. The sampled frame period, $T_S$, may be determined by the receiver readout rate with the caveat that $T_S$>$NT_0$. Note that the sampled M-frame coefficient cube is now digitized and stored in digital memory such that further digital processing 1222 is possible (see also the disclosure with respect to FIG. 5).

Invert the M-frame coefficient cube and retrieve a temporal image cube 1224 based on the mathematical relationship described in Eq. 4. For example, the temporal response of the $i,j^{th}$ pixel is retrieved via $S_{i,j}(t)=HC_{i,j}$.

Assemble the temporal image cube 1224.

Figure 13:
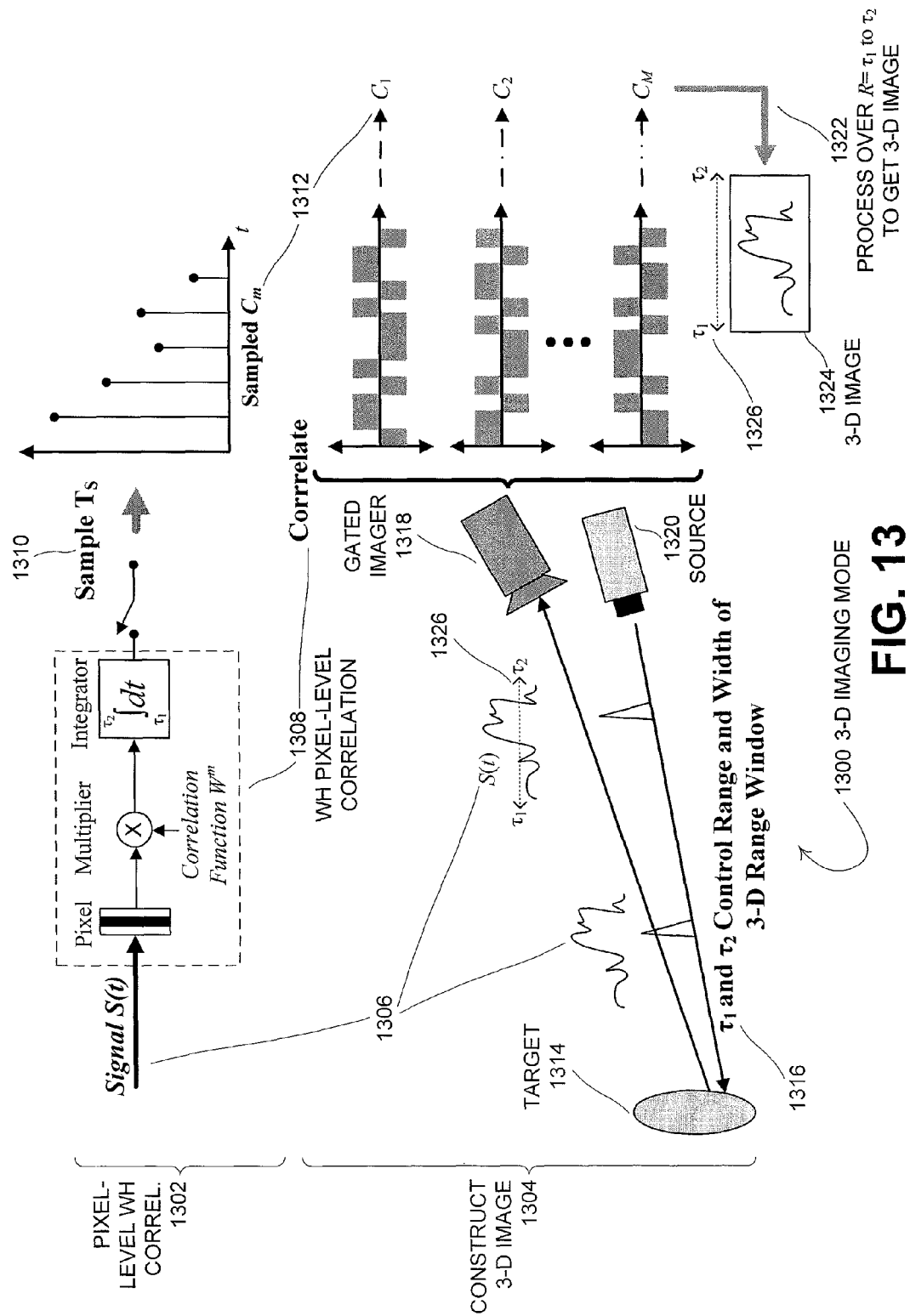
FIG. 13 is an illustration of operation of a three-dimensional (3-D) image mode embodiment.

FIG. 13 is an illustration of operation 1300 of a three-dimensional (3-D) image mode embodiment. Three-dimensional imaging is based on a windowed version of the temporally resolved imaging mode described in the disclosure with respect to FIG. 12. A signal 1306 reflected from an actively illuminated target 1314 is temporally decomposed into output coefficients $C_m$ 1312 by correlation 1308 with orthogonal functions $W^m$. However, for 3-D imaging, correlation decomposition is performed over a user defined range window $τ_1$ to $τ_2$ 1326 ($R_1=τ_1c/2$ to $R_2=τ_2c/2$). The 3-D image 1324 is formed because each pixel projects a Walsh coefficient vector C 1312 corresponding to the pixel's projected range profile over the range window $τ_1$ to $τ_2$ 1326. The use of a user defined range window as apposed to a fixed or predetermined range window helps to prevent wasteful acquisition of unwanted range data and efficient control of range resolution.

The illustration of operation for 3-D imaging 1300 of FIG. 13 may be broken down into a pixel-level WH correlation section 1302 and a 3-D image construction section 1304. The pixel-level WH correlation section 1302 illustrates the pixel-level WH correlation that is described in further detail in the disclosure with respect to FIG. 5. The 3-D image construction section 1304 describes the process of correlating 1308 the input signal over a range 1326 and the processing 1318 to create the 3-D image result 1320 of the 3-D imaging mode processing 1322. The source 1320 provides an active signal over time window $τ_1$ to $τ_2$ 1326 such that $τ_1$ and $τ_2$ control the range and width of the corresponding 3-D range window 1316. The input signal 1306 for the 3-D range window is returned from the target 1314 to the gated imager 1328. The cyclo-stationary input signal 1306 is received at the gated imager 1318, which may be one of the switched FPA topologies as described in the disclosure with respect to FIG. 6, and is WH correlated at the pixel level 1308 (see also the disclosure with respect to FIG. 5) over the time period $\tau_1$ to $\tau_2$ 1326 corresponding to the range window $R_1=\tau_1 c/2$ to $R_2=\tau_2 c/2$, where c is the speed of light. The pixel-level WH correlation 1308 is then performed and digitally sampled 1310 with a period of $T_S$ to produce the WH projected output coefficients $C_m$ 1312 in the digital domain over time window $\tau_1$ to $\tau_2$ 1326. The projected output coefficients $C_m$ 1212 for time window $\tau_1$ to $\tau_2$ 1326 are then digitally processed 1322 to produce a windowed 3-D image cube 1324. 3-D imaging mode operation may be summarized as follows.

- Generate and transmit an optical pulse-train from a source (or sources) 1320 of pulse width less than or equal to $T_0/M$, where $T_0=\tau_1-\tau_2$ is the width of the range window and M is the length of the Walsh correlation sequence. A pulse-train repetition rate will typically be limited by range ambiguities, but should not exceed $1/T_0$.
- Capture the target 1314 reflected optical signal, S(t) 1306, with an optical aperture. The optical aperture may be comprised of a primary optical aperture that is focused onto the Focal Plane Array (FPA) via an optical secondary.
- Correlate the time-scaled Walsh vector, $W^m$, with signal S(t) resulting in projection coefficients, $C_m$ 1312. The WH correlation may be performed by employing one of the switching topologies described in the disclosure with respect to FIG. 6. Temporal windowing is controlled by time-scaling the sequence period to the window $T_0=\tau_1-\tau_2$, with the integration window time-gated to the range window, $\tau_1$ to $\tau_2$ 1326, and corresponding range $R_1=\tau_1 c/2$ to $R_2=\tau_2 c/2$. Multi-sample coefficient averaging (over the frame period, $T_S$) is accomplished by sequentially gating and integrating over the window $\tau_1$ to $\tau_2$ 1326 over N samples, provided the pulse-train repetition rate requirements from above are observed.
- Sequentially sample and digitize the M consecutive image frames containing projection coefficients $C_m$ 1312 corresponding to the time-scaled Walsh vectors, $W^m$, m=1, 2, . . . , M. The sampled frame rate, $T_S$, may be determined by the receiver frame/readout rate with the caveat that $T_S>NT_0$. Note that the sampled M-frame coefficient cube is now digitized and stored in digital memory such that further digital processing 1322 is possible (see also the disclosure with respect to FIG. 5).
- Invert the M-frame coefficient cube and retrieve a temporal image cube based on the mathematical relationship described in Eq. 4. For example, the temporal response of the $i,j^{th}$ pixel is retrieved via $S_{i,j}(t)=HC_{i,j}$.
- Assemble the range-resolved image cube (i.e., 3-D image cube) 1324 by scaling the temporal image cube via $R_m=R_1+\tau_m c/2$, m=1,2, . . . , M.

A further 3-D imaging example may combine active 3-D with passive imaging in a hybrid passive/active mode. Essentially, the hybrid passive/active mode may be a two-channel CDMA/3-D process that simultaneously acquires a passive background image with an active 3-D overlay. The hybrid 3-D mode may be capable of addressing both depth-perception ambiguities and enabling the precise geo-referencing of imaged objects by simultaneously generating a 3-D overlay in near-perfect spatial registration with the passively acquired 2-D image.

Figure 14:
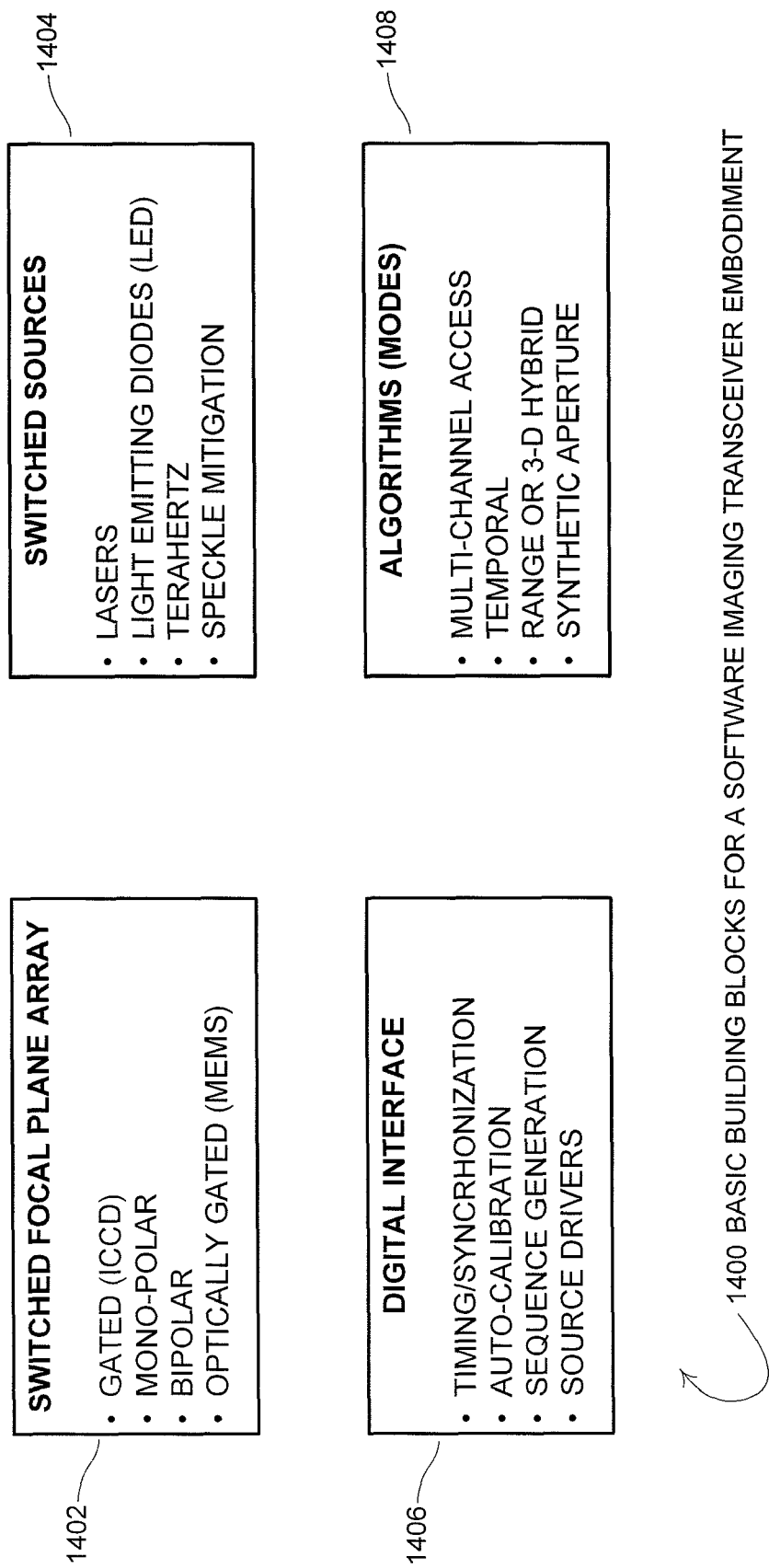
FIG. 14 is an illustration of basic building blocks for a software imaging transceiver for an embodiment.

FIG. 14 is an illustration of basic building blocks 1400 for a software imaging transceiver for an embodiment. As described in the disclosure with respect to FIGS. 1-13, multiple different types of imaging modes may be simultaneously implemented using the same hardware and a single common sensor by utilizing Walsh-Hadamard mathematical relationships to correlate an incoming optical signal for representation and reconstruction in the digital domain. Since the image mode processing is occurring in the digital domain, a software based transceiver may be implemented to perform multimode (i.e., multiple image mode processing) based on the detection of an optical single by a single, common sensor. Thus, like a Personal Computer (PC) or other computer platform, a software transceiver may be implemented that simultaneously performs multiple types of image processing as well as permitting programming by users for additional image mode processing if so desired. Further, similar to a "Plug & Play" architecture for current PCs, a software based imager might enable standardized transceiver building-blocks 1400 to be readily installed, configured and programmed to address a variety of imaging applications. The basic building blocks for an embodiment may include: a switched Focal Plane Array (FPA) 1402, switched sources 1404, a digital interface 1406, and supported imaging modes/algorithms 1408. Switched FPAs 1402 were discussed in great detail in the disclosure with respect to FIGS. 5-8. Various potential imaging modes/algorithms 1408 were discussed in detail in the disclosure with respect to FIGS. 9-13. Thus, further discussion of the Switched FPAs 1402 and imaging modes/algorithms 1408 is not necessary. Further discussion of the digital interface 1406 may be found below in the disclosure with respect to FIG. 15.

For switched sources 1404, there are a wide variety of quality short-pulse, high-repetition rate lasers and Light Emitting Diodes (LEDs) commercially available or under development. Other attractive new technologies for switched sources 1404 include white-light laser/LEDs and terahertz sources. Key considerations for optimal multimode image acquisition include timing issues and speckle mitigation. If stable sources 1404 are not readily available, the overall system may be able to detect and track source drift, jitter, and other stability problems. If the receiver is incapable of consistent single-source or multi-source synchronization, the desired high compression factors may not be reached. Mitigation of speckle degradation is possible with spread-spectrum (i.e., double correlation) architectures because the transverse phase of each transmitted pulse may be spatially modulated to provide statistically independent speckles at the receiver. Correlation over the spread-spectrum pulses may effectively average the speckle resulting in Signal-to-Noise Ratio (SNR) improvements that are proportional to the square-root of the compression gain (see disclosure with respect to FIG. 5). The correlation process may work down to very low photon rates. A mechanical diffuser wheel may be used for speckle mitigation. Additional promising speckle mitigation schemes include acoustic modulation of oversized optical fibers, spatial-phase modulation (e.g., electro-optic SLM arrays), and switched MEMs devices.

Figure 15:
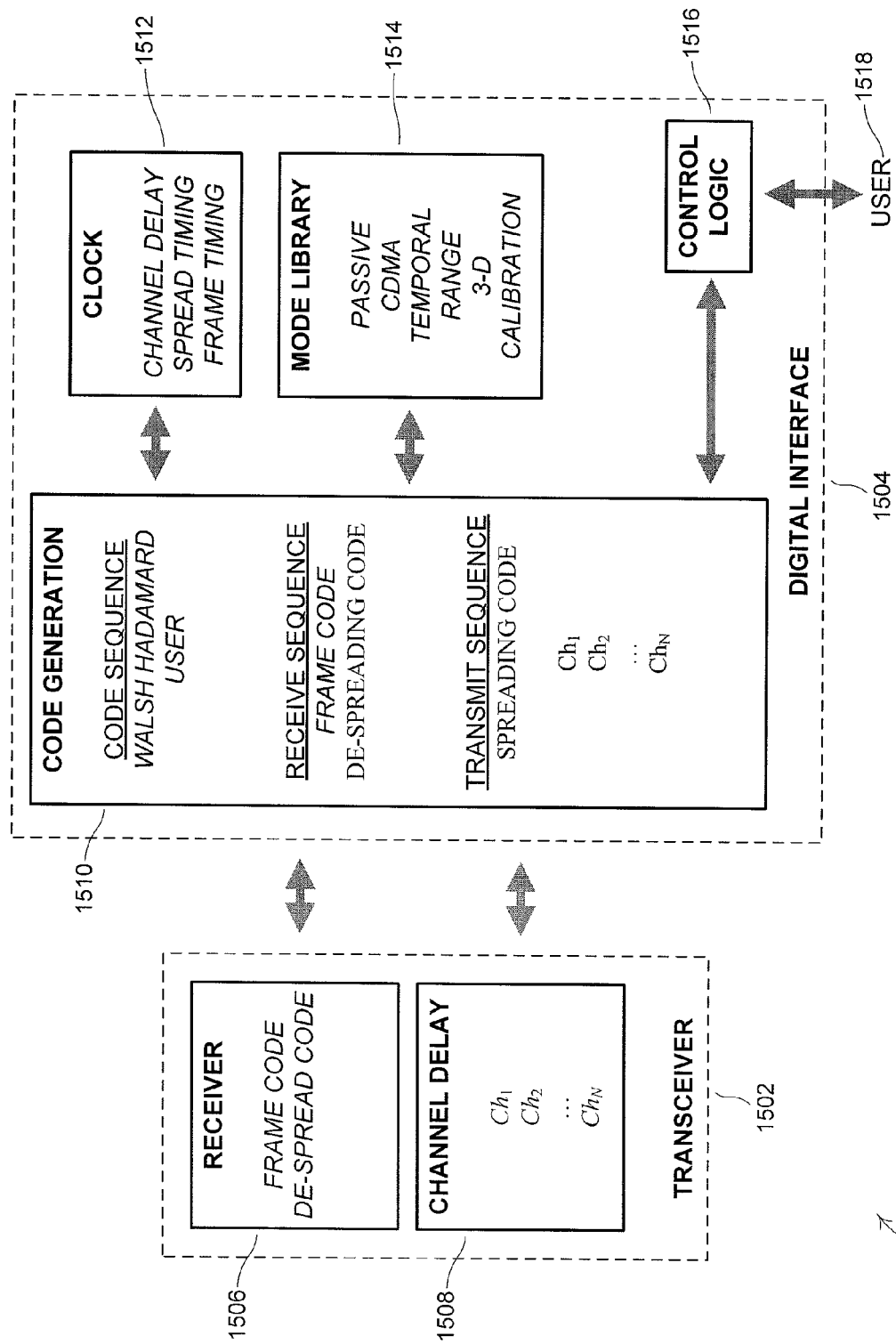
FIG. 15 is an illustration of basic building blocks for a digital interface for an embodiment.

FIG. 15 is an illustration of basic building blocks 1500 for a digital interface 1504 for an embodiment. The digital interface 1504 is a central piece of the software imaging architecture for an embodiment. The digital interface 1504 may provide control and synchronization between sources, cameras/FPAs, and a user processing computer. A standardized digital interface 1504 may reduce development costs and encourage rapid prototyping of new applications by formalizing interface requirements. The standardized digital interface 1504 may enable more efficient implementation of new algorithms (aka. modes) as well as new devices, including: cameras, displays, lasers, LEDs, etc.

The digital interface embodiment 1504 shown in FIG. 15 provides for standardized interfaces between the code/sequence generation system 1510, the receiver 1506, and channel delay system 1508. The digital interface 1504 may also provide an interface for a user 1518 to operate the imager and/or to program the imager for new or altered applications. Various embodiments may connect the user interface 1518 through control logic 1516 to the code generation system 1510 (or other digital domain systems such as the clock 1512 and the mode/algorithm library 1514). The code generation system 1510 and the clock 1512 and mode/algorithm library 1514 may also be in the digital domain 1504, but the clock and mode libraries may need to access (or be accessed by) the code generation system 1510 in order to properly correlate code sequences for either or both of the transmitter side and/or the receiver side. For various embodiments, calibration, timing, and synchronization functions may be fit into a single compact Application-Specific Integrated Circuit (ASIC) or Field Programmable Gate Array (FPGA) chip set capable of driving a variety of devices and generating code sequences 1510 desired for multimode acquisition. An FPGA chip set synthesized from a portable hardware description language (e.g., Very High Level Design Language—VHDL) may permit cost effective hardware solutions that optimize miniaturization, scalable functionality, speed, volume, power, and weight.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for capturing an image of a target through a single common sensor and producing at least one image mode of a plurality of potential image modes of said target comprising:
   capturing an incoming optical signal at an optical aperture;
   detecting said incoming optical signal captured at said optical aperture with a square-law sensor acting as said common sensor to convert said incoming optical signal to an electrical signal;
   passing said electrical signal through a low-noise amplifier to produce a Low-Noise Amplified (LNA) signal;
   passing said LNA signal through at least one correlator, said at least one correlator having a time scalable Walsh-Hadamard binary basis function;
   calculating a correlation output coefficient for said at least one correlator in order to temporally correlate said LNA signal, said correlation output coefficient of said at least one correlator being calculated in accordance with Walsh-Hadamard mathematical principles as a function of said Walsh-Hadamard binary basis function of said at least one correlator;
   digitizing said correlation output coefficient of said at least one correlator into a digital correlation output coefficient for said at least one correlator by passing said correlation output coefficient signal through an analog-to-digital converter for said at least one correlator; and,
   performing image mode processing on said digital correlation output coefficient of said at least one correlator in a digital processing domain to produce said at least one image mode of said plurality of potential image modes.

2. The method of claim 1 further comprising:
   providing a plurality of pixel square-law sensors such that each pixel square-law sensor of said plurality of pixel square-law sensors operates as said square-law sensor;
   combining said plurality of said pixel square-law sensors into an array of pixel square-law sensors such that each pixel square-law sensor of said plurality of pixel square-law sensors represents a pixel of a grid of pixels of a gated imaging device;
   providing an integrator, a switch, and an analog-to-digital converter for each pixel of said grid of pixels;
   sequentially performing said correlation output coefficient calculations separately for each pixel of said grid of pixels such that each instance of said at least one correlator calculates a separate correlation output coefficient for each pixel of said grid of pixels, each instance of said at least one correlator results in an array of correlation output coefficients with an array entry for each pixel of said grid of pixels, each of said separate correlation output calculations for each instance of said at least one correlator shares said Walsh-Hadamard binary basis function associated with each instance of said at least one correlator for each pixel of said array of pixels, and said correlation output calculations are performed sequentially by each pixel of said grid pixels by operating said integrator of each pixel of said grid of pixels sequentially for each instance of said at least one correlator;
   sequentially digitizing, in coordination with said sequential performance of said correlation output coefficient calculations, said correlation output coefficients for each pixel by sampling said correlation output coefficient of each pixel for each instance of said at least one correlator using said switch of each pixel at a readout rate of said gated imaging device and converting said correlation output coefficient to said digital coefficient output coefficient by passing said correlation output coefficient through said analog-to-digital converter for each pixel in order to provide an array of digital correlation output coefficients corresponding to said array of correlation output coefficients for each instance of said at least one correlator.

3. The method of claim 2 further comprising: providing an integrator, switch, and analog-to-digital converter for each instance of said at least one correlator for each pixel of said grid of pixels such that said sequential performance of said correlation output coefficient calculations and said coordinated sequential digitizing of said correlation output coefficients is performed simultaneously in a parallel fashion on each instance of said at least one correlator.

4. The method of claim 1 further comprising:
   combining said plurality of digital correlation output signals into a digital frame coefficient cube;
   inverting said digital frame coefficient cube in said digital processing domain in accordance with said Walsh-Hadamard mathematical principles to obtain temporal response image cube information;
   assembling said temporal response image cube information into a temporal image cube.

5. The method of claim 1 wherein said process of performing image mode processing further comprises performing multimode image processing by performing image mode processing for multiple image modes simultaneously in order to concurrently produce multiple image mode results.

6. The method of claim 1 further comprising:
passing said LNA signal through a low frequency mixer in order to down convert said LNA into a down-converted signal that has a lower intermediate-frequency; and,
filtering said down-converted signal in order to band-limit said down-converted signal to produce a band-limit filtered signal prior to said process of correlating said LNA signal such that said band-limit filtered signal is correlated as said LNA signal in said process of correlating said LNA signal.

7. The method of claim 1 wherein said plurality of potential image modes is at least two of a group consisting of: multichannel access imaging, temporal imaging, range slicing imaging, three-dimensional (3-D) imaging, and synthetic aperture imaging.

8. A method for capturing an image of a target through a single common sensor and producing at least one image mode of a plurality of potential image modes of said target comprising:
capturing an incoming optical signal at an optical aperture;
detecting said incoming optical signal captured at said optical aperture with a square-law sensor acting as said common sensor to convert said incoming optical signal to an electrical signal;
passing said electrical signal through a low-noise amplifier to produce a Low-Noise Amplified (LNA) signal;
passing said LNA signal through at least one correlator, said at least one correlator having a time scalable Walsh-Hadamard binary basis function;
providing a plurality of optical sources, each optical source transmitting on a unique optical channel;
modulating an optical channel output signal of each of said plurality of optical sources with a unique Walsh-Hadamard baseband binary code sequence;
modulating said optical channel output signal of each of said plurality of optical sources already modulated with said unique Walsh-Hadamard baseband binary code sequence a second time with a high-frequency spreading code, said high frequency spreading code being common for said plurality of optical sources;
transmitting said twice modulated optical channel output signals by said plurality of optical sources;
optically combining said twice modulated optical channel output signals into a single combined optical output signal using an appropriate optical beam combining system;
reflecting said single combined optical output signal off said target to create a reflected signal, said reflected signal being said incoming optical signal;
providing a plurality of pixel square-law sensors combined as a grid of pixel square-law sensors such that each pixel square-law sensor of said plurality of pixel square-law sensors operates as said square-law sensor;
calculating a correlation output coefficient for said at least one correlator in order to temporally correlate said LNA signal, said correlation output coefficient of said at least one correlator being calculated in accordance with Walsh-Hadamard mathematical principles as a function of said Walsh-Hadamard binary basis function of said at least one correlator and such that said calculation of said correlation output coefficient is further performed with reference to a synchronized reference high-frequency spreading code that is synchronized with said high-frequency spreading code via a synchronizing communication link to said high-frequency spreading code;
digitizing said correlation output coefficient of said at least one correlator into a digital correlation output coefficient for said at least one correlator by passing said correlation output coefficient signal through an analog-to-digital converter for said at least one correlator such that said a plurality of digital correlation output coefficient signals represents a digital frame data cube of combined optical intensity detected at each pixel square-law sensor of said grid of pixel said square-law sensors; and,
performing image mode processing on said digital correlation output coefficient of said at least one correlator in a digital processing domain to produce said at least one image mode of said plurality of potential image modes, further comprising:
correlating said digital frame data cube in accordance with said Walsh-Hadamard mathematical principles a second time in said digital processing domain using orthogonal Walsh-Hadamard binary code sequences that are orthogonal to said unique Walsh-Hadamard baseband binary code sequences in order to retrieve image data cube information for optical intensity of each unique channel of said plurality of optical sources for each pixel of said grid of pixels; and,
assembling said image data cube information into a multi-channel access image data cube.

9. The method of claim 8 wherein said synchronized reference high-frequency spreading code is time-delayed such that said processes of said method of claim 4 produces a range slice image data cube.

10. A multimode image acquisition system for capturing an image of a target through a single common sensor and producing at least one image mode of a plurality of potential image modes of said target comprising:
an optical aperture that captures an incoming optical signal;
a detector that detects said incoming optical signal captured at said optical aperture to convert said incoming optical signal to an electrical signal, said detector being a square-law sensor acting as said common sensor;
a low-noise amplifier that receives said electrical signal and produces a Low-Noise Amplified (LNA) signal;
at least one correlator that receives said LNA signal and calculates a correlation output coefficient for said at least one correlator in order to temporally correlate said LNA signal, said at least one correlator having a time scalable Walsh-Hadamard binary basis function, said correlation output coefficient being calculated in accordance with Walsh-Hadamard mathematical principles as a function of said Walsh-Hadamard binary basis function of said at least one correlator;
an analog-to-digital converter that accepts said correlation output coefficient of said at least one correlator and that digitizes said correlation output coefficient into a digital correlation output coefficient signal for said at least one correlator; and,
a multimode image processing subsystem that performs image mode processing on said digital correlation output coefficient for said at least one correlator in a digital processing domain to produce said at least one image mode of said plurality of potential image modes.

11. The multimode image acquisition system of claim 10 further comprising:

a plurality of pixel square-law sensors such that each pixel square-law sensor of said plurality of pixel square-law sensors operates as said square-law sensor;

a gated imaging device that combines said plurality of said pixel square-law sensors into an array of pixel square-law sensors such that each pixel square-law sensor of said plurality of pixel square-law sensors represents a pixel of a grid of pixels of a gated imaging device, each pixel of said grid of pixels has an integrator, a switch, and an analog-to-digital converter for each pixel of said grid of pixels;

a gated imaging device calculation subsystem that sequentially performs said correlation output coefficient calculations separately for each pixel of said grid of pixels such that each instance of said at least one correlator calculates a separate correlation output coefficient for each pixel of said grid of pixels, each instance of said at least one correlator results in an array of correlation output coefficients with an array entry for each pixel of said grid of pixels, each of said separate correlation output calculations for each instance of said at least one correlator shares said Walsh-Hadamard binary basis function associated with each instance of said at least one correlator for each pixel of said array of pixels, and said correlation output calculations are performed sequentially by each pixel of said grid pixels by operating said integrator of each pixel of said grid of pixels sequentially for each instance of said at least one correlator;

a gated imaging device digitization subsystem that sequentially digitizes, in coordination with said sequential performance of said correlation output coefficient calculations, said correlation output coefficients for each pixel by sampling said correlation output coefficient of each pixel for each instance of said at least one correlator using said switch of each pixel at a readout rate of said gated imaging device and converting said correlation output coefficient to said digital coefficient output coefficient by passing said correlation output coefficient through said analog-to-digital converter for each pixel in order to provide an array of digital correlation output coefficients corresponding to said array of correlation output coefficients for each instance of said at least one correlator.

12. The multimode image acquisition system of claim 11 further comprising: an integrator, switch, and analog-to-digital converter for each instance of said at least one correlator for each pixel of said grid of pixels such that said gated imaging device calculation subsystem and said gated imaging device digitization subsystem operate simultaneously in a parallel fashion on each instance of said at least one correlator.

13. The multimode image acquisition system of claim 10 further comprising:
a frame coefficient combination subsystem that combines said plurality of digital correlation output signals into a digital frame coefficient cube;
an inversion subsystem that inverts said digital frame coefficient cube in said digital processing domain in accordance with said Walsh-Hadamard mathematical principles to obtain temporal response image cube information;
an assembly subsystem that assembles said temporal response image cube information into a temporal image cube.

14. The multimode image acquisition system of claim 10 wherein said multimode image processing subsystem performs image mode processing for multiple image modes simultaneously in order to concurrently produce multiple image mode results.

15. The multimode image acquisition system of claim 10 further comprising:
a low frequency mixer that receives said LNA signal and down converts said LNA signal to a down-converted signal that is a lower intermediate-frequency signal; and,
a band-limit filter that filters said down-converted signal in order to band-limit said down-converted signal to produce a band-limit filtered signal prior to sending said LNA signal to said at least one correlator such that said band-limit filtered signal is correlated as said LNA signal by said at least one correlator.

16. A multimode image acquisition system for capturing an image of a target through a single common sensor and producing at least one image mode of a plurality of potential image modes of said target comprising:
an optical aperture that captures an incoming optical signal;
a detector that detects said incoming optical signal captured at said optical aperture to convert said incoming optical signal to an electrical signal, said detector being a square-law sensor acting as said common sensor;
a low-noise amplifier that receives said electrical signal and produces a Low-Noise Amplified (LNA) signal;
a plurality of optical sources, each optical source transmitting on a unique optical channel;
a Walsh-Hadamard modulating subsystem that modulates an optical channel output signal of each of said plurality of optical sources with a unique Walsh-Hadamard baseband binary code sequence;
a spreading code modulating subsystem that modulates said optical channel output signal of each of said plurality of optical sources already modulated with said unique Walsh-Hadamard baseband binary code sequence a second time with a high-frequency spreading code, said high frequency spreading code being common for said plurality of optical sources;
an optical beam combining system that optically combines said twice modulated optical channel output signals transmitted by said plurality of optical sources into a single combined optical output signal that reflects off said target to create a reflected signal, said reflected signal being said incoming optical signal;
a plurality of pixel square-law sensors combined as a grid of pixel square-law sensors such that each pixel square-law sensor of said plurality of pixel square-law sensors operates as said square-law sensor;
at least one correlator that receives said LNA signal and calculates a correlation output coefficient for said at least one correlator in order to temporally correlate said LNA signal, said at least one correlator having a time scalable Walsh-Hadamard binary basis function, said correlation output coefficient being calculated in accordance with Walsh-Hadamard mathematical principles as a function of said Walsh-Hadamard binary basis function of said at least one correlator;
an analog-to-digital converter that accepts said correlation output coefficient of said at least one correlator and that digitizes said correlation output coefficient into a digital correlation output coefficient signal for said at least one correlator; and,
a communication link between said spreading code modulating subsystem and a spreading code reference subsystem;

said spreading code reference subsystem that injects said synchronized reference high-frequency spreading code into a plurality of correlators that calculate a plurality of correlation output signals such that said plurality of digital correlation output coefficient signals represents a digital frame data cube of combined optical intensity detected at each pixel square-law sensor of said grid of pixel said square-law sensors, said synchronized reference high-frequency spreading code being said high-frequency spreading code sent from said spreading code modulating subsystem via said communication link;

a multimode image processing subsystem that performs image mode processing on said digital correlation output coefficient for said at least one correlator in a digital processing domain to produce said at least one image mode of said plurality of potential image modes, and further comprising:

a second correlation subsystem that correlates said digital frame data cube in accordance with said Walsh-Hadamard mathematical principles a second time in said digital processing domain using orthogonal Walsh-Hadamard binary code sequences that are orthogonal to said unique Walsh-Hadamard baseband binary code sequences in order to retrieve image data cube information for optical intensity of each unique channel of said plurality of optical sources for each pixel of said grid of pixels;

an assembly subsystem that assembles said image data cube information into a multi-channel access image data cube.

17. The multimode image acquisition system of claim 16 wherein said synchronized reference is time-delayed such that said assembly subsystem produces a range slice image data cube.

18. A multimode image acquisition system for capturing an image of a target through a single common sensor and producing at least one image mode of a plurality of potential image modes of said target comprising:

means for capturing an incoming optical signal at an optical aperture;

means for detecting said incoming optical signal captured at said optical aperture with a square-law sensor acting as said common sensor to convert said incoming optical signal to an electrical signal;

means for passing said electrical signal through a low-noise amplifier to produce a Low-Noise Amplified (LNA) signal;

means for passing said LNA signal through at least one correlator, said at least one correlator having a time scalable Walsh-Hadamard binary basis function;

means for calculating a correlation output coefficient for said at least one correlator, said correlation output coefficient of said at least one correlator being calculated in accordance with Walsh-Hadamard mathematical principles as a function of said Walsh-Hadamard binary basis function of said at least one correlator;

means for digitizing said correlation output coefficient of said at least one correlator into a digital correlation output coefficient for said at least one correlator by passing said correlation output coefficient signal through an analog-to-digital converter for said at least one correlator; and, means for performing image mode processing on said digital correlation output coefficient of said at least one correlator in a digital processing domain to produce said at least one image mode of said plurality of potential image modes.

* * * * *